United States Patent
Chigasaki

[19]

[11] Patent Number: 5,956,300
[45] Date of Patent: Sep. 21, 1999

[54] COMPACT AUDIO DISC CHANGER WITH DISC DRIVE MOUNTED ON MOVABLE ELEVATOR

[75] Inventor: Hiroyuki Chigasaki, Tokyo, Japan

[73] Assignee: Sony Corporation, Tokyo, Japan

[21] Appl. No.: 08/151,463

[22] Filed: Nov. 12, 1993

Related U.S. Application Data

[63] Continuation of application No. 07/807,211, Dec. 16, 1991, abandoned.

[30]     Foreign Application Priority Data

Dec. 22, 1990    [JP]    Japan ................................ 2-413526

[51] Int. Cl.⁶ .................................................. G11B 17/22
[52] U.S. Cl. ............................................................ 369/34
[58] Field of Search ........................ 360/99.05, 99.12; 369/36, 38, 37, 35, 34

[56]     References Cited

U.S. PATENT DOCUMENTS

| | | | |
|---|---|---|---|
| 3,815,150 | 6/1974 | Stoddard et al. | 360/99.05 |
| 4,561,078 | 12/1985 | Nakayama | 369/36 |
| 4,701,900 | 10/1987 | Hasegawa et al. | 369/36 |
| 4,841,499 | 6/1989 | Takahashi et al. | 369/38 |
| 4,864,551 | 9/1989 | Tomita et al. | 369/36 |
| 4,918,548 | 4/1990 | O'Donnell et al. | 360/92 |
| 4,949,324 | 8/1990 | Arata | 369/36 |
| 5,027,335 | 6/1991 | Deis | 369/37 |
| 5,093,818 | 3/1992 | Suzuki | 369/36 |

FOREIGN PATENT DOCUMENTS

| | | |
|---|---|---|
| 0215767 | 3/1987 | European Pat. Off. . |
| 0284815 | 10/1988 | European Pat. Off. . |
| 2213979 | 8/1989 | United Kingdom . |
| 89-05508 | 6/1989 | WIPO . |

*Primary Examiner*—David D. Davis
*Attorney, Agent, or Firm*—Jay H. Maioli

[57]     ABSTRACT

A disc player is provided, in which an arbitrary disc is pulled out from a disc compartment in which a plurality of discs are stacked and then reproduced. An elevator chassis (4) having a disc transport mechanism and a disc chucking mechanism mounted thereon is coupled at three of its four sides to a main chassis (1) provided as a reference plane by an X-letter type supporting member of a pantograph configuration which can be freely contracted and expanded, and an elevating drive mechanism is connected to one place of on the elevator chassis (4). The elevator chassis (4) is elevated in parallel to the main chassis (1) by driving the elevator chassis at only one place. Further, the elevator chassis (4) is locked to the main chassis (1) by a locking mechanism during the playback of the disc.

5 Claims, 18 Drawing Sheets

ABSTRACT# COMPACT AUDIO DISC CHANGER WITH DISC DRIVE MOUNTED ON MOVABLE ELEVATOR

This is a continuation of application Ser. No. 07/807,211 filed Dec. 16, 1991 abandoned now.

BACKGROUND OF THE INVENTION

1. Field of the Invention

The present invention generally relates to a disc player and, more particularly, to a disc player having a disc auto changer wherein a plurality of discs can be exchanged and then reproduced.

2. Description of the Related Art

A disc player having a disc auto changer mechanism has been proposed so far, in which a plurality of discs are housed in a stacked fashion and an arbitrary disc is exchanged and then reproduced.

Such disc player is arranged as follows: A plurality of discs can be housed in a stacked fashion, a disc pack formed as an independent mechanism can be made freely detachable and a disc conveying mechanism for conveying a disc to a disc loading unit is elevated relative to the disc pack, thereby an arbitrary disc being pulled out and reproduced.

In one such disc player, in order to elevate the disc pull-out mechanism relative to the disc pack, an elevator chassis having the disc pull-out mechanism mounted thereon is supported by a plurality of feed screws, e.g., three feed screws vertically disposed on the chassis provided as a reference plane and these three feed screws are rotated in the same phase by using a single large gear to thereby elevate the elevator chassis relative to the chassis.

However, in order to stably elevate the elevator chassis having the disc pull-out mechanism mounted thereon, rotary phases of the three feed screws must accurately become identical by the adjustment. Further, the feed screws, the large gear and so on occupy a large space, which makes the elevating mechanism large in size. As a result, the entirety of the disc player becomes large in size, the number of assembly parts is increased and the disc player becomes expensive.

OBJECTS AND SUMMARY OF THE INVENTION

Therefore, it is an object of the present invention to provide an improved disc player in which the aforementioned shortcomings and disadvantages encountered with the prior art can be eliminated.

More specifically, it is an object of the present invention to provide a disc player in which an elevator chassis having a disc pull-out mechanism can be simplified in arrangement and elevated smoothly in parallel to a reference plane.

Another object of the present invention is to provide a disc player in which the number of assembly parts of an elevating drive mechanism can be reduced.

Still another object of the present invention is to provide a disc player in which a space in which an elevating drive mechanism is disposed can be reduced considerably.

A further object of the present invention is to provide a disc player which can be made compact in size.

A yet further object of the present invention is to provide a disc player which can be made inexpensive.

An additional object of the present invention is to provide a disc player having a disc changer mechanism.

As an aspect of the present invention, in the disc player, an elevator chassis having a disc pull-out mechanism, a disc chucking mechanism or the like is supported at least on its opposing side walls to a chassis provided as a reference plane by a supporting member which can be freely contracted and expanded so that the elevator chassis can be elevated.

As described above, according to the present invention, since the elevator chassis having the disc pull-out mechanism, the disc chucking mechanism or the like is supported at least on its opposing side walls to the chassis provided as the reference plane by the supporting member which can be freely contracted and expanded, the elevator chassis can be elevated.

The elevator chassis can be elevated in parallel to the chassis only by driving the elevating drive mechanism, which can reduce the number of assembly parts forming the elevating drive mechanism and which also can reduce the space in which the elevating drive mechanism is disposed.

BRIEF DESCRIPTION OF THE DRAWINGS

A better understanding of other objects, features, and advantages of the present invention can be gained from a consideration of the following detailed description of illustrative embodiments thereof, in conjunction with the figures of the accompanying drawings in which.

DETAILED DESCRIPTION OF THE PREFERRED EMBODIMENTS

The present invention will now be described with reference to the accompanying drawings.

Figure 1:
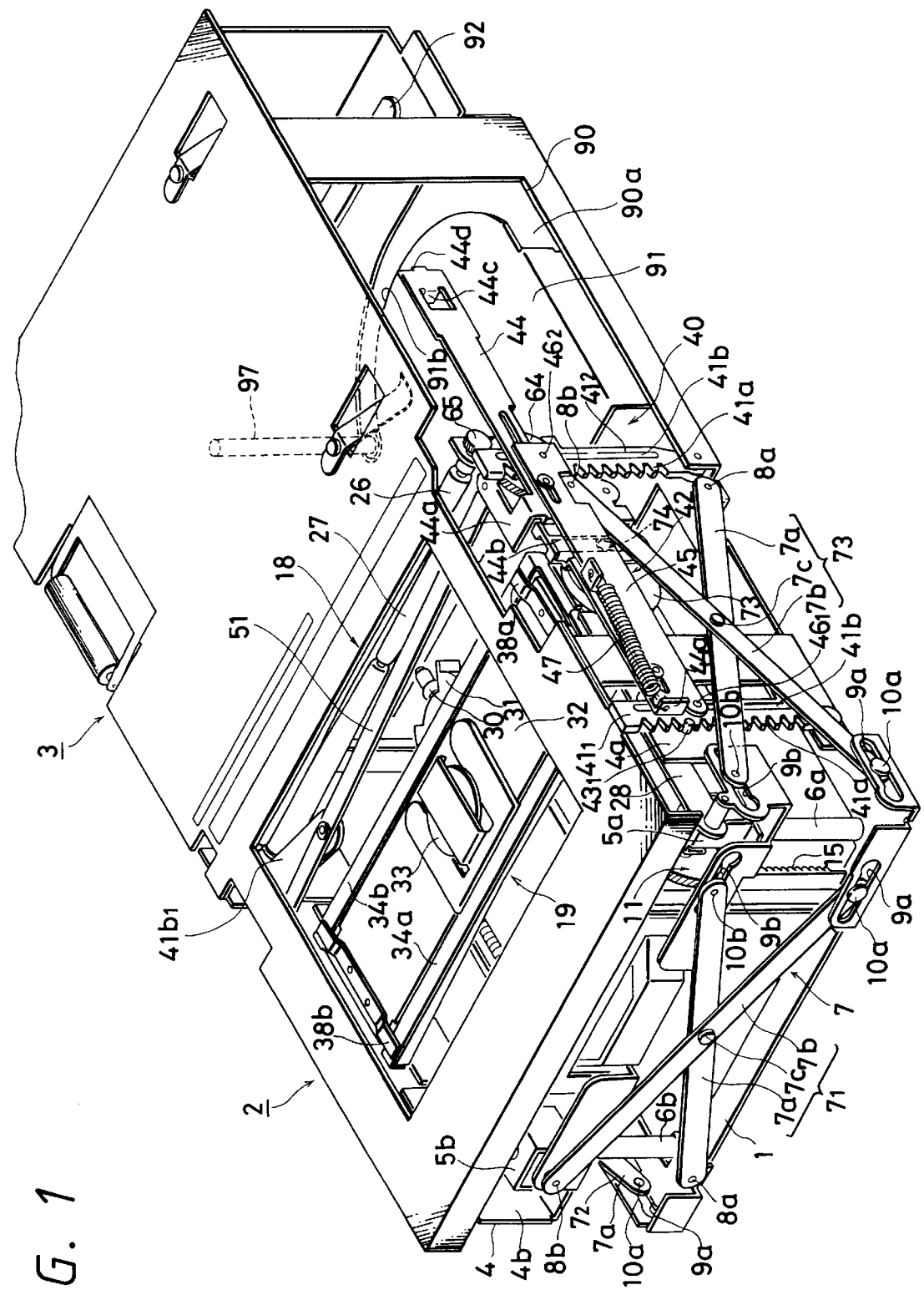
FIG. 1 is a perspective view illustrating an overall arrangement of a first embodiment of a disc player according to the present invention.
Figure 2:
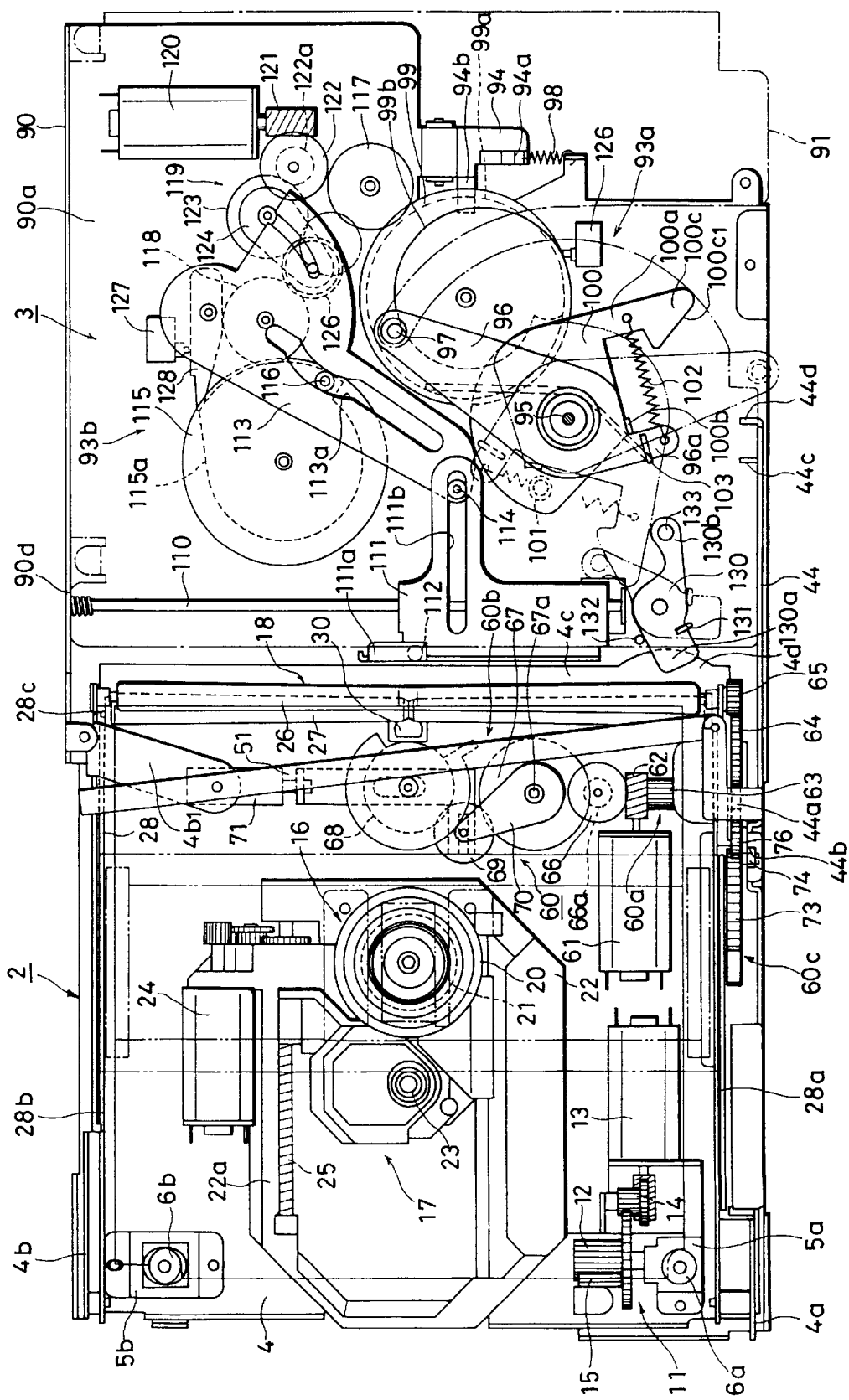
FIG. 2 is a fragmentary plan view of the disc player shown in FIG. 1.

FIGS. 1 and 2 of the accompanying drawings show substantially an overall arrangement of a disc player having a disc auto changer according to the present invention. Referring to FIGS. 1 and 2, a disc reproducing mechanism 2 is provided on the first or front half of a chassis 1 and a disc housing unit 3 is provided on the second or rear half of the chassis 1. The disc reproducing mechanism 2 is mounted on an elevator chassis 4 which is elevated relative to the chassis 1 and therefore the disc reproducing mechanism 2 is elevated in an opposing relation to the disc housing unit 3.

The elevator chassis 4 having the disc reproducing mechanism 2 mounted thereon can be elevated in parallel to the chassis 1 by slidably fitting bearing members 5a, 5b vertically provided at the front wall into guide shafts 6a, 6b implanted on the chassis 1 and is coupled to and supported by supporting members 7 ($7_1$, $7_2$ and $7_3$) of pantograph-configuration coupled in an X-letter shape at the front wall and left and right side walls so as to expand and contract in the vertical direction. Both supporting members 7a and 7b of each of the pantograph supporting member 7 are rotatably coupled by a connection pin 7c at the central portion of the supporting members 7a and 7b. First end portions of the supporting members 7a, 7b are pivoted to the chassis 1 and the elevator chassis 4 by shaft pins 8a, 8b and the second end portions thereof are slidably coupled together by engaging shaft pins 10a, 10n into elliptic apertures 9a, 9b formed through the chassis 1 and the elevator chassis 4 substantially in the horizontal direction.

An elevation drive mechanism 11 is provided at one side corner of the front wall of the chassis 1 and the elevator chassis 4 and the elevation drive mechanism 11 comprises a pinion 12, a drive motor 13 for driving the pinion 12 and a reduction gear 14 provided on the elevator chassis 4 and a rack 15 erected on the chassis 1 so as to be meshed with the pinion 12.

When the pinion 12 of the elevation drive mechanism 11 is driven by the drive motor 13 through the reduction gear 14, then the pinion 12 is rotated relative to the rack 15 so that the elevator chassis 4 is moved upward or downward relative to the chassis 1 by the rotating direction of the pinion 12. As a consequence, in accordance with the upward and downward movement of the elevator chassis 4, the supporting members 7 of pantograph configuration are expanded and contracted, that is, the two supporting members 7a, 7b are able to rise and fall about the coupling support center 7c defined by the coupling pin 7c. Accordingly, as the two supporting members 7a and 7b rise and fall, the spacing between first and second ends of the two supporting members 7a and 7b remain equal to each other so that, even when only one side corner of the front wall of the elevator chassis 4 is elevated, that is, moved upward or downward by the pinion 12 and the rack 15 as described before, the other side of the front wall of the elevator chassis 4 is elevated with the same height, whereby the two side wall are elevated with the same height in the front and rear portions, thus the entirety of the elevator chassis 4 being elevated in parallel to the chassis 1.

Accordingly, the elevator chassis 4 can be elevated in parallel to the chassis 1 regardless of the corner on which the elevator drive mechanism 11 is provided.

With the above-mentioned configuration, if the accuracy of the assembly parts forming the supporting member 7 of pantograph configuration and the accuracy of the pivot portion and the slidable and engaging portion thereof relative to the two chassis 1 and 4 are increased to a certain extent, then an adjustment in the assembly process becomes unnecessary and also a space factor is increased.

As shown in FIGS. 1 and 2, the disc reproducing mechanism 2 mounted on the thus arranged elevator chassis 4 comprises a disc rotating mechanism 16 for supporting and rotating a disc D, a signal read-out mechanism 17 for reading an information signal from the rotating disc D, a disc conveying mechanism 18 for conveying the disc D toward the rotating mechanism 16 and a disc chucking mechanism 19 for urging the disc D against the rotating mechanism 16.

The disc rotating mechanism 16 comprises a turntable 20 for holding the disc D at the center aperture thereof and a spindle motor 21 for rotating the turntable 20 and is mounted to a supporting frame 22 at substantially the central portion of the elevator chassis 4. The supporting frame 22 is extended in the front wall direction of the elevator chassis 4 to provide an extended portion 22a. An optical pickup 23 of the signal read-out mechanism 17 is supported to this extended portion 22a so as to become movable in the turntable 20 direction and the supporting frame 22 is transported by a feed screw shaft 25 rotated by a motor 24.

The disc conveying mechanism 18 comprises a drive roller 26 and a follow-up roller 27 provided at the rear portion of the elevator chassis 4 in an opposing relation to each other in the vertical direction. The drive roller 26 provided above the follow-up roller 27 is pivoted between rear end portions of the two side walls 4a and 4b of the elevator chassis 4 and is driven by a drive mechanism which will be described later. The follow-up roller 27 is rotatably supported to a movable supporting frame 28 in parallel to a rear edge portion 28c of the movable supporting frame 28 and in an opposing relation to the lower side of the drive roller 26. This movable support frame 28 has a configuration of inverted C letter corresponding to the shape of the two side edge portions to the rear edge portions of the elevator chassis 4 and is rotatably supported relative to the elevator chassis 4 about the front end portions of the two side edge portions 28a, 28b pivoted to the front end portions of the two side surface plates 4a, 4b of the elevator chassis 4.

The movable supporting frame 28 which pivotally supports the follow-up roller 27 is constantly spring-biased upward by a compression coil spring interposed between the rear edge portion 28c side and the elevator chassis 4 and the follow-up roller 27 is rotatably brought in contact with the drive roller 26 at its both end sides. A roller 30 is pivoted to the central portion of the rear edge portion 28c in the forward direction and the roller 30 is pivoted to the elevator chassis 4 so as to rotatably come in contact with a cam 31 rotated by a drive mechanism which will be described later.

By the rotation of the cam 31, the roller 30 is downwardly pushed and the movable supporting frame 28 is downwardly rotated about the pivoted portions of the front end portions against the spring-biasing force of the coil spring, whereby the follow-up roller 27 is made distant from the drive roller 26. Also, the disc chucking mechanism 19 is constructed so that a pushing plate 32 secured to the movable supporting frame 28 above the turntable 20 includes a chucking plate 33 and upper and lower disc holders 34a, 34b and 35a, 35b.

More specifically, the pushing plate 32 is laterally secured between the two side edge portions 28a and 28b above the turntable 20 together with the lower holders 35a, 35b and the pushing plate 32 has at its central portion the chucking plate 33 loosely fitted in parallel to the turntable 20 in an opposing relation to the turntable 20. A pair of front and rear upper holders 34a, 34b are disposed at the front and rear edge portions of the pushing plate 32, and the upper holders 34a and 34b are made of a resin of a bar-shape configuration whose length is substantially the same as that of the lateral direction of the pushing plate 32. The upper holders 34a and 33b are concave at their lower surfaces opposing the disc D in substantially an arc shape to provide end portions $34a_1$, $34a_2$ and $34b_1$, $34b_2$ which are downwardly curved. The upper holders 34a and 34b are secured to frames 36a and 36b having arm portions $36a_1$, $36a_2$ and $36b_2$, $36b_2$ provided at their both sides respectively, and end portions of arm portions $36a_1$, $36b_2$ and $36b_1$, $36b_2$ are respectively pivoted to the respective side walls of the pushing plate 32 so that the upper holders 34a and 34b can be rotated relative to the pushing plate 32 in the vertical direction. Engaging pins $37a_1$, $37a_2$ and $37b_1$, $37b_2$ are projected from the arm portions 36a1, 36a2 and $36b_1$, $36b_2$ of the frames 36a and 36b so as to come in contact with the upper edges of the two side wall plates 4a, 4b of the elevator chassis 4 under the condition such that the upper holders 34a, 34b are located at substantially the same plane as the pushing plate 32 after they have been rotated downward.

Pushing spring members 38a, 38b are attached to the pushing plate 32 so that the upper holders 34a, 34b are constantly spring-biased downward via the frames 36a and 36b.

Figure 5:
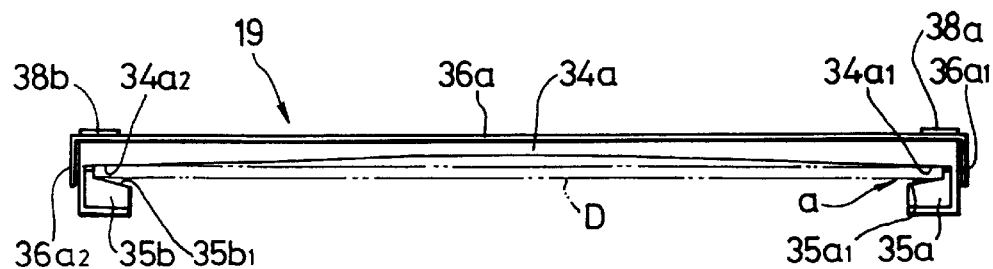
FIG. 5 is a front view of a disc chucking mechanism of the disc player according to the present invention.
Figure 6:
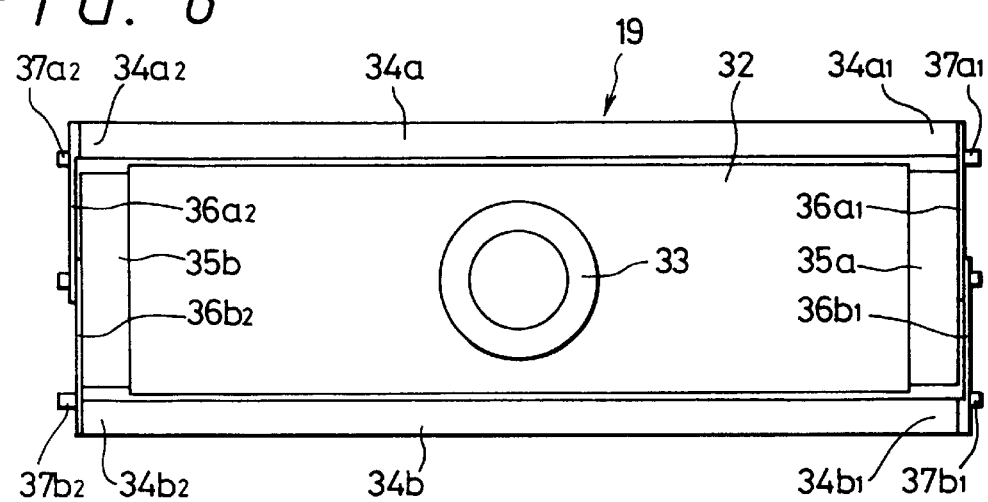
FIG. 6 is a bottom view thereof.
Figure 7:
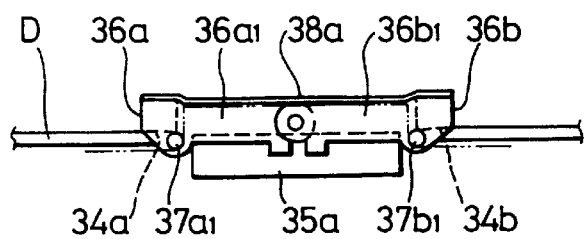
FIG. 7 is a side view thereof.
Figure 8:
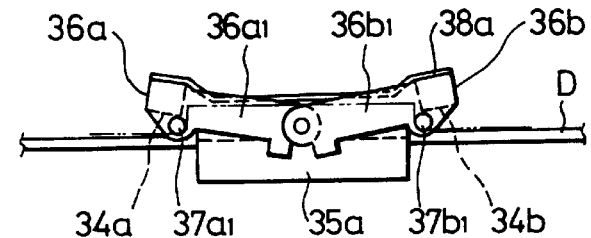
FIG. 8 is a side view thereof and illustrating the condition such that the above-mentioned disc chucking mechanism is operated.
Figure 9:
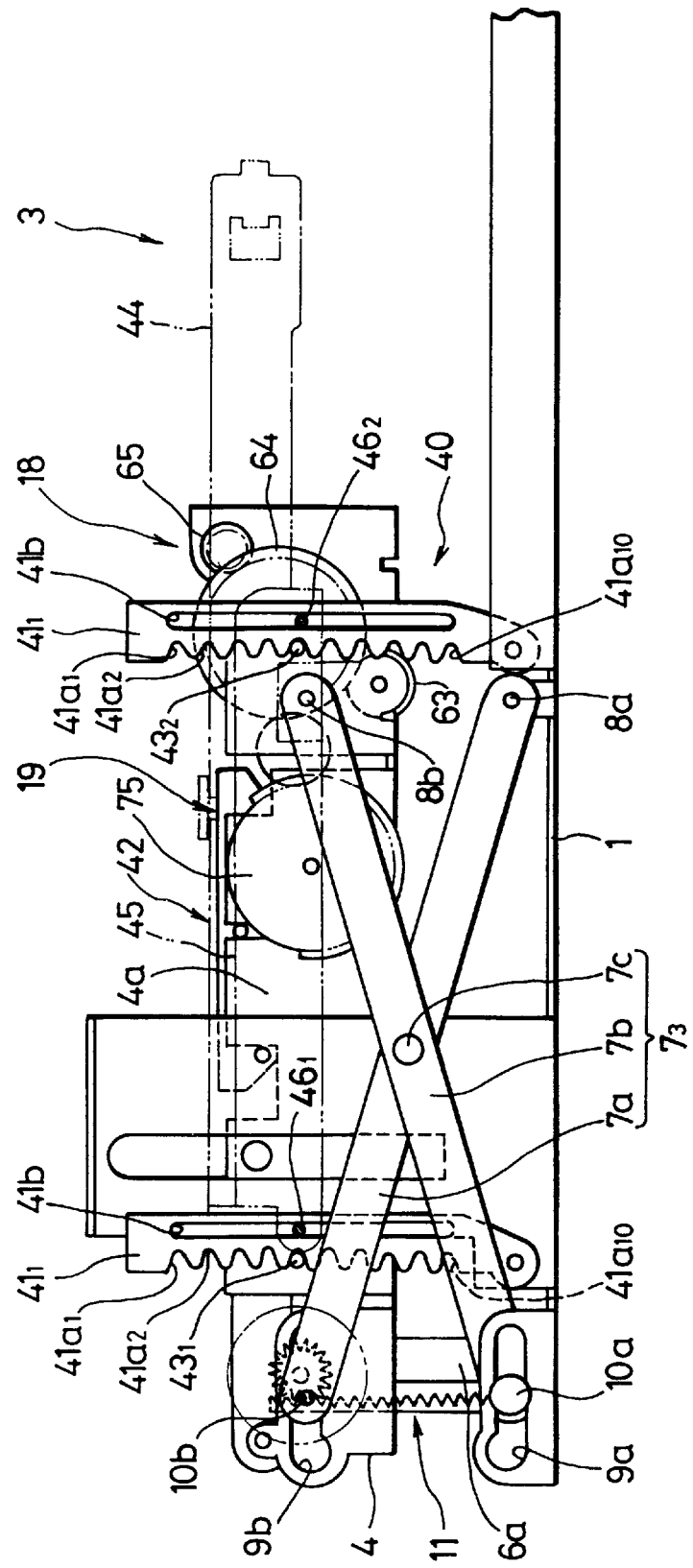
FIG. 9 is a fragmentary side view of one portion of the disc player.

Lower holders 35a, 35b are disposed below the two side portions of the pushing plate 32 with a spacing a which is a little wider than the thickness of the disc D. As shown in FIG. 5, a pair of lower holders 35a and 35b have disc engaging holding surface portions $35a_1$, and $25b_1$, each of which has a length substantially the same as the width of the pushing plate 32 in the front and rear direction and which are inclined inwardly.

The disc chucking mechanism 19 thus arranged holds the disc D by the upper holders 34a, 34b and the lower holders 35a, 35b under the condition such that the central aperture of the disc D is opposed to the chucking plate 33 under the pushing plate 32.

Under the condition that the disc D is held as described above, the lower surfaces, i.e., the surfaces opposing the disc D of the upper holders 34a and 34b are formed as the concave and curved ones so that the two curved end portions $34a_1$, $34a_2$ and $34b_1$, $34b_2$ of the upper holders 34a and 34b are brought in contact with only the upper corner edge portion of the circumferential surface of the disc D. Also, the engaging holding surface portions $35a_1$ and $35b_1$ of the lower holders 35a and 35b are inwardly inclined so that the engaging holding surface portions $35a_1$ and $35b_1$ thereof are brought in contact with only the lower side corner edge of the circumferential surface of the disc D, thereby holding the disc D therebetween. Therefore, the disc surface, i.e., recording surface of the disc D can be protected from damage.

The movable supporting frame 28 is rotated downward, whereby the disc D is held on the turntable 20. In this state, the chucking plate 33 is urged against the disc D so that the disc D is held on the turntable 20. When the movable support frame 28 is rotated downward more, then the engaging pins $37a_1$, $37a_2$ and $37b_1$, $37b_2$ of the frames 36a and 36b are engaged with the upper edges of the two side plates 4a, 4b of the elevator chassis 4, thereby the upper holders 34a and 35a being rotated upward relative to the pushing plate 32 so as to become distant from the upper surface of the disc D. Also, the lower holders 35a and 35b are moved downward and become isolated from the lower surface of the disc D, thereby the disc D being released or made free.

Accordingly, by driving the spindle motor 21, the disc D is rotated under the condition such that it is held by the turntable 20 and the chucking plate 33.

Between the elevator chassis 4 on which the disc reproducing mechanism 2 is mounted and the chassis 1, a locking mechanism 40 is provided in order to lock the elevator chassis 4 relative to the chassis 1 at a plurality of predetermined elevating positions, i.e., in order to lock the elevator chassis 4 relative to the chassis 1 in response to respective addresses of the disc housing stages of the disc housing unit 3 which will be described later.

The locking mechanism 40 comprises a locking lever 41 and a locking operation member 42, and the locking lever 41 is composed of locking levers $41_1$, $41_2$ provided at front and rear positions of one side wall between the chassis 1 and the elevator chassis 4 and a locking lever $41_3$ provided at the rear position of the other side wall side between the chassis 1 and the elevator chassis 4. The locking levers $41_1$, $41_2$ of one side wall have on their front edge sides and the locking lever $41_3$ of the other side wall has on its rear edge side a plurality of disc housing stages corresponding to predetermined elevating positions of the elevator chassis 4, that is, engaging slit groups 41a ($41a_1$, $41a_2$ through $41a_{10}$) of substantially V-letter configuration corresponding to the first to tenth addresses communicated in the longitudinal direction in this embodiment, and also guiding rectangular apertures 41b are respectively formed through the central portions of the locking levers $41_1$, $41_2$ and $41_3$ in the longitudinal direction.

The locking levers $41_1$, $41_2$ and $41_3$ are pivoted to the chassis 1 in response to the front and rear portions of one side wall and the rear portion of the other side wall of the elevator chassis 4 so as to be elevated in the front and rear directions, respectively. Then, by engaging one of the engaging grooves $41a_1$ through $41a_{10}$ with engaging pins $43_1$, $43_2$, $43_3$ protruded from the elevator chassis 4 in response to the respective locking levers 41, the elevator chassis 4 is locked to the chassis 1 so that the elevator chassis 4 cannot be moved. When the locking levers $41_1$ through $41_3$ are inclined, then the engaging groove is released from the engaging pin, whereby the elevator chassis 4 is released from being locked to the chassis 1. Thus, the elevator chassis 4 can be elevated.

A locking operation member 42 for operating these locking members $41_1$, $41_2$, $41_3$ is operated in a ganged relation to a pull-out lever 44 which is provided as a pull-out mechanism for pulling the optical disc from the disc housing unit 3. The pull-out lever 44 is provided on one side wall of the elevator chassis 4 to be expanded toward the disc housing unit 3 side so that it can be slid in the front and rear direction. An operation lever 45 is coupled to the outer side wall of the pull-out lever 44 so as to become slidable in the front and back direction (i.e., in the longitudinal direction). Engaging pins $46_1$ and $46_2$ are protrusively provided on respective ends of the operation lever 45 and these engaging pins $46_1$ and $46_2$ are respectively engaged with the guide rectangular openings 41b bored through the front rear locking levers $41_1$ and $41_2$ of one side wall. Thus, when the operation lever 45 is slid in the front and rear direction, the locking levers $41_1$ and $41_2$ are rotated in a ganged relation with each other.

The operation lever 45 is constantly spring-biased in the forward direction by a tension coil spring 47 extended between it and the front end portion of the pull-out lever 44 and, under this state, the top of the operation lever 45 is brought in contact with the engaging piece member 44a formed on the top of the pull-out lever 44. In order to couple the operation lever 45 to the pull-out lever 44 under this condition, rear ends of the guide apertures 45a, 45b bored through the operation lever 45 in the front and rear direction are engaged with supporting pins 48a, 48b protrusively formed on the pull-out lever 44.

Figure 10:
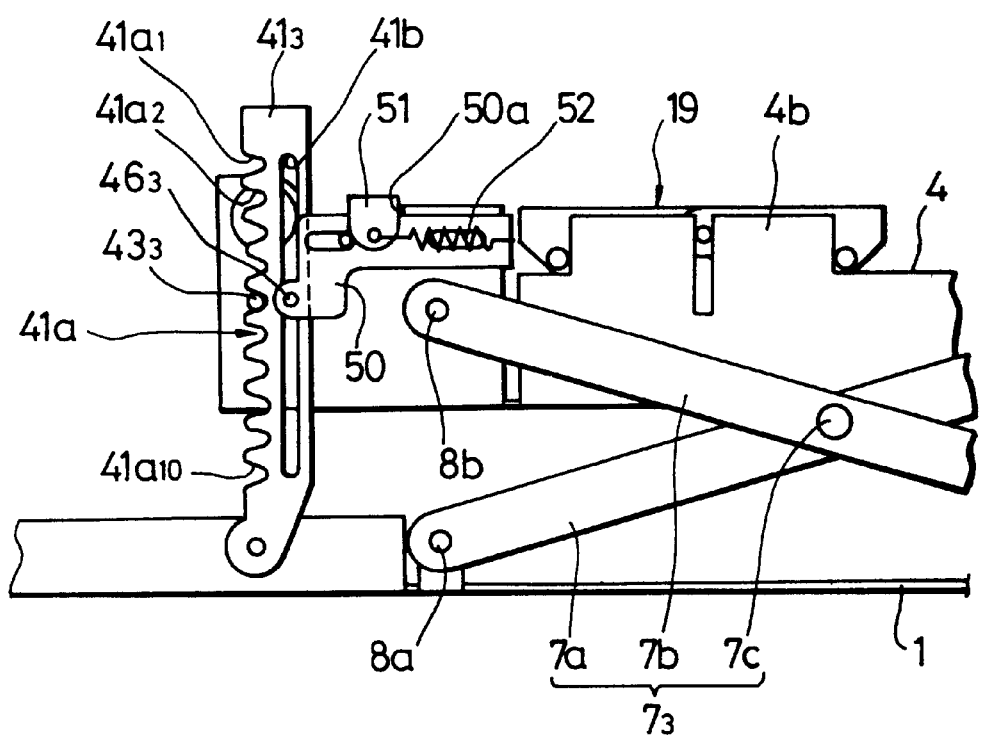
FIG. 10 is other side view thereof.
Figure 11:
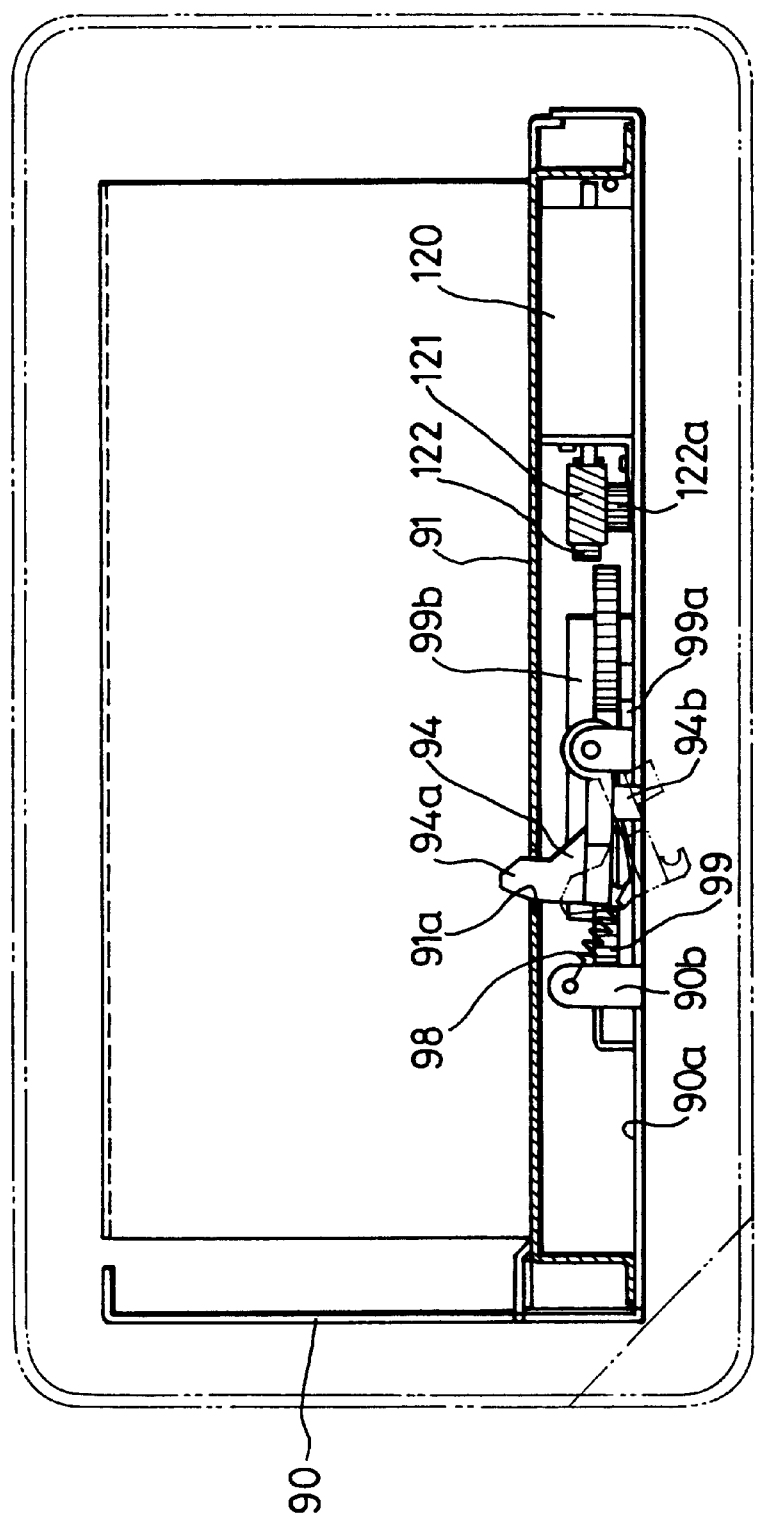
FIG. 11 is a cross-sectional view of a disc compartment of the disc player according to the present invention.
Figure 12:
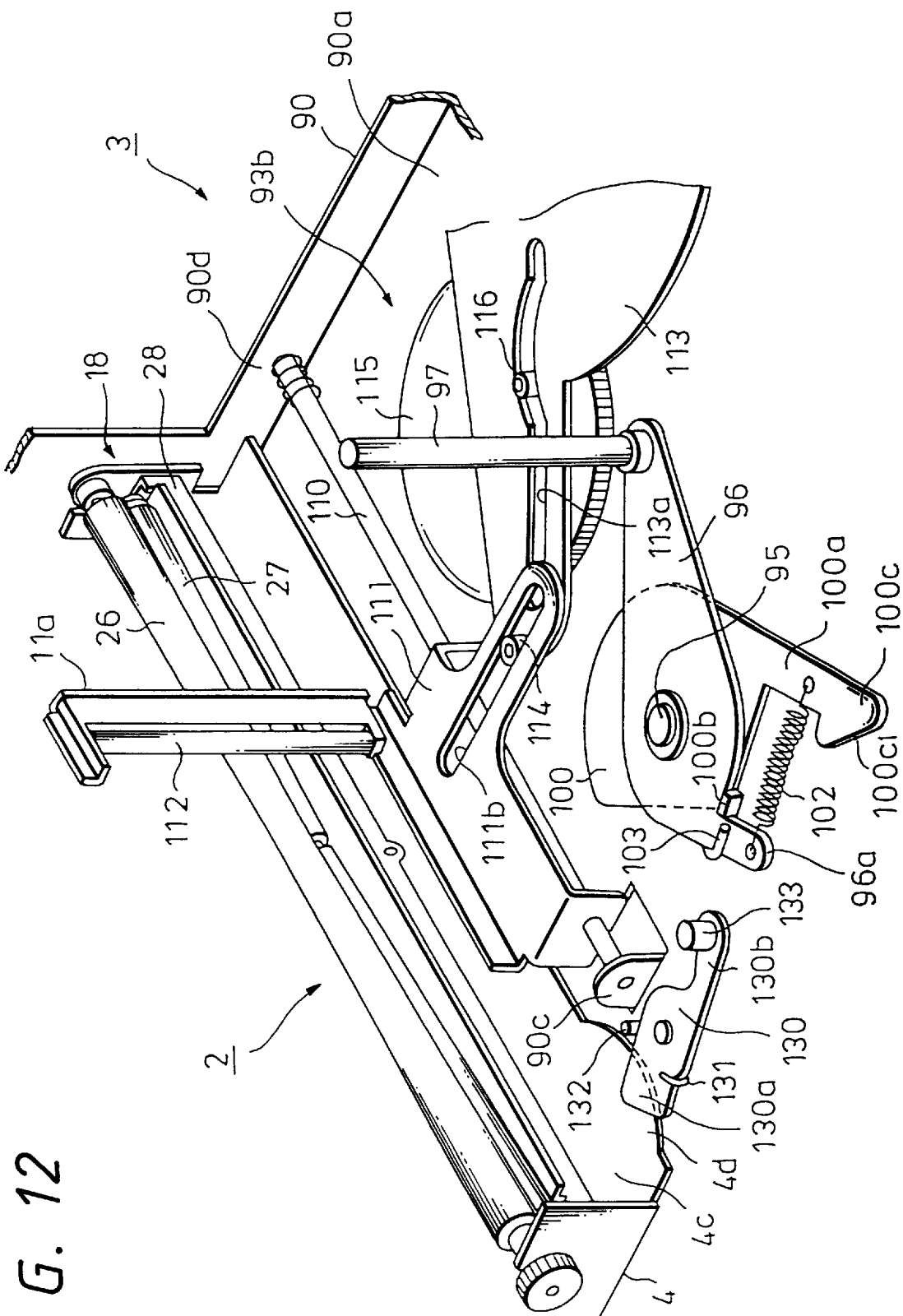
FIG. 12 is a partially cross-sectional perspective view of one portion of the disc compartment portion shown in FIG. 11.
Figure 13:
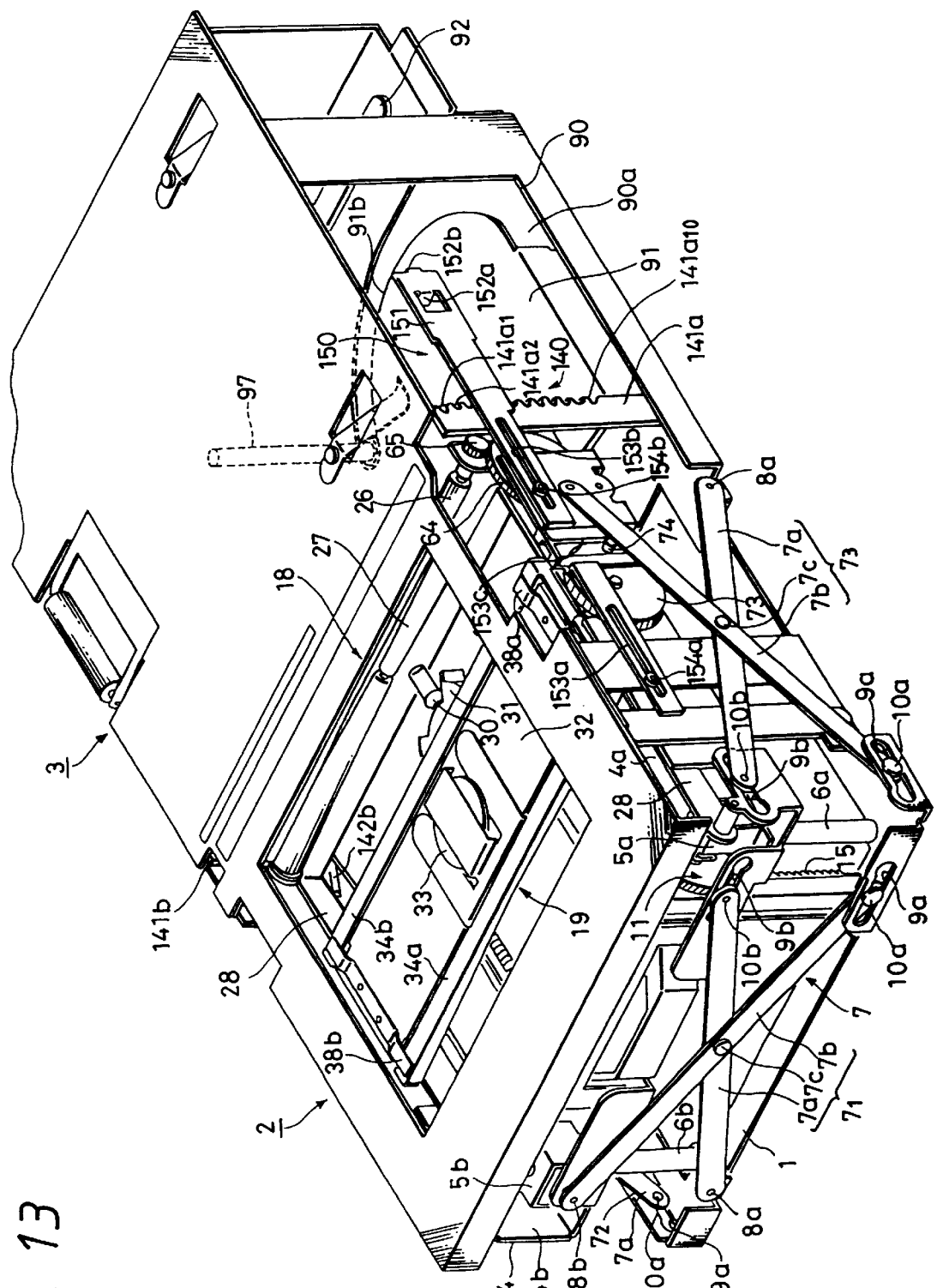
FIG. 13 is a perspective view illustrating an overall arrangement of a second embodiment of the disc player according to the present invention.
Figure 14:
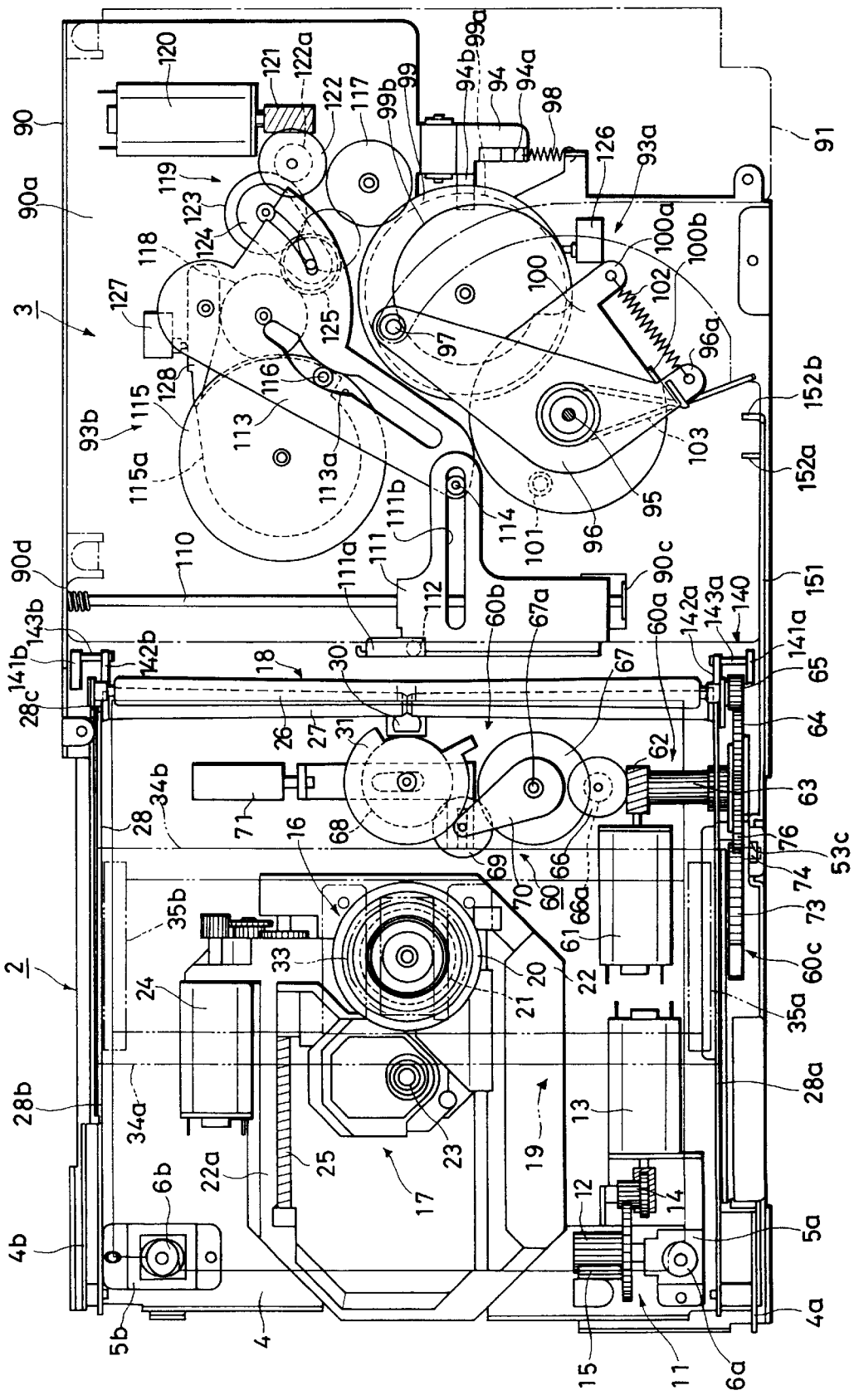
FIG. 14 is a fragmentary plan view of the disc player shown in FIG. 13.
Figure 15:
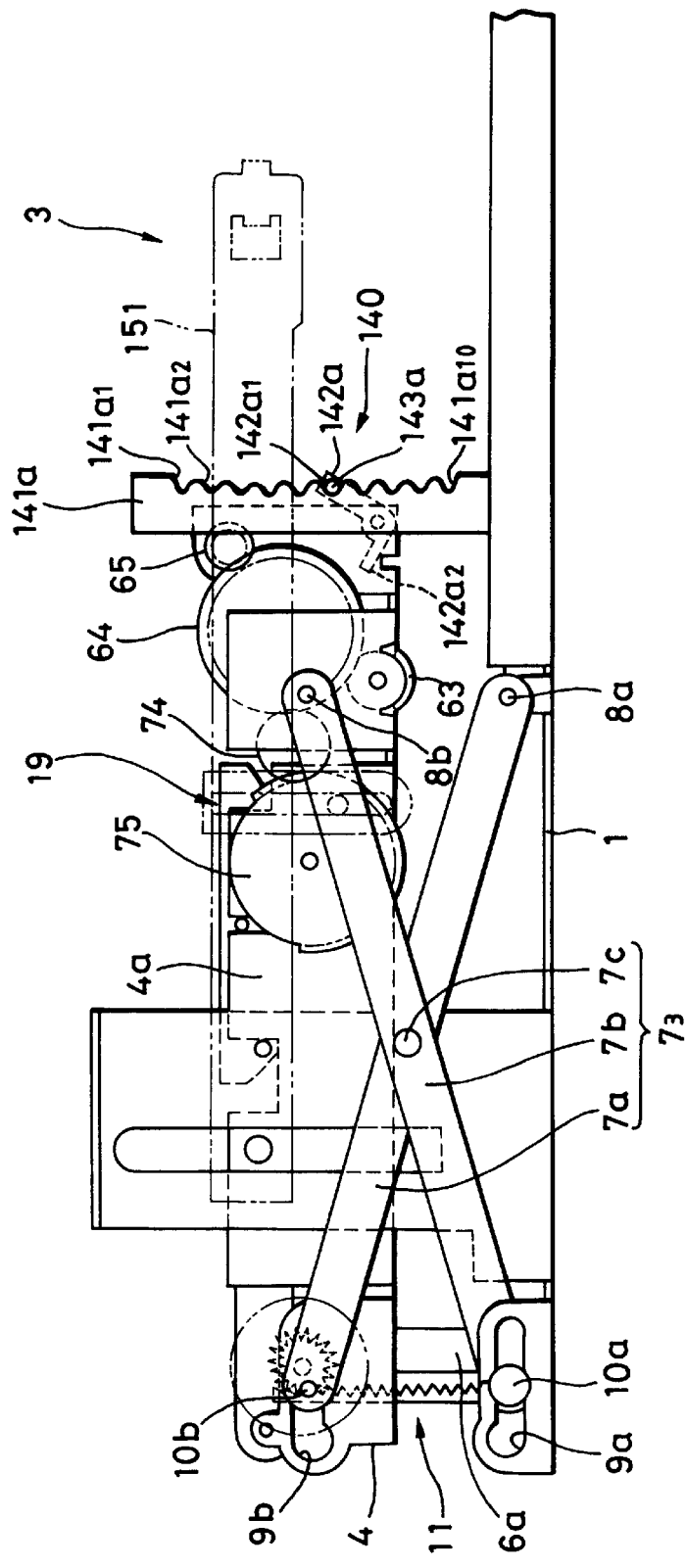
FIG. 15 is a fragmentary side view of one portion of the disc player of the second embodiment shown in FIG. 13.
Figure 16:
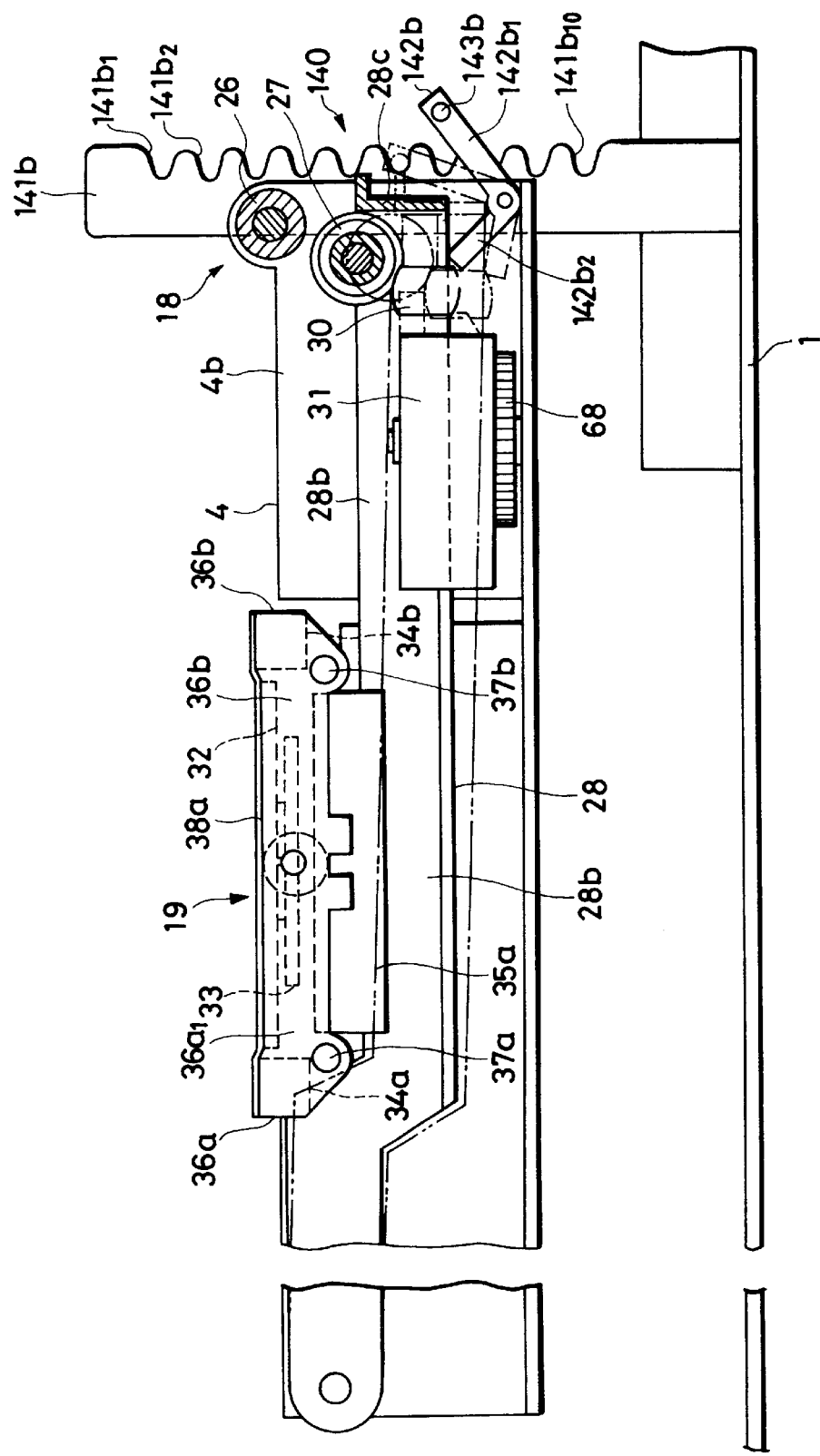
FIG. 16 is a fragmentary side view of other example of a main portion of the locking mechanism of the present invention.
Figure 17:
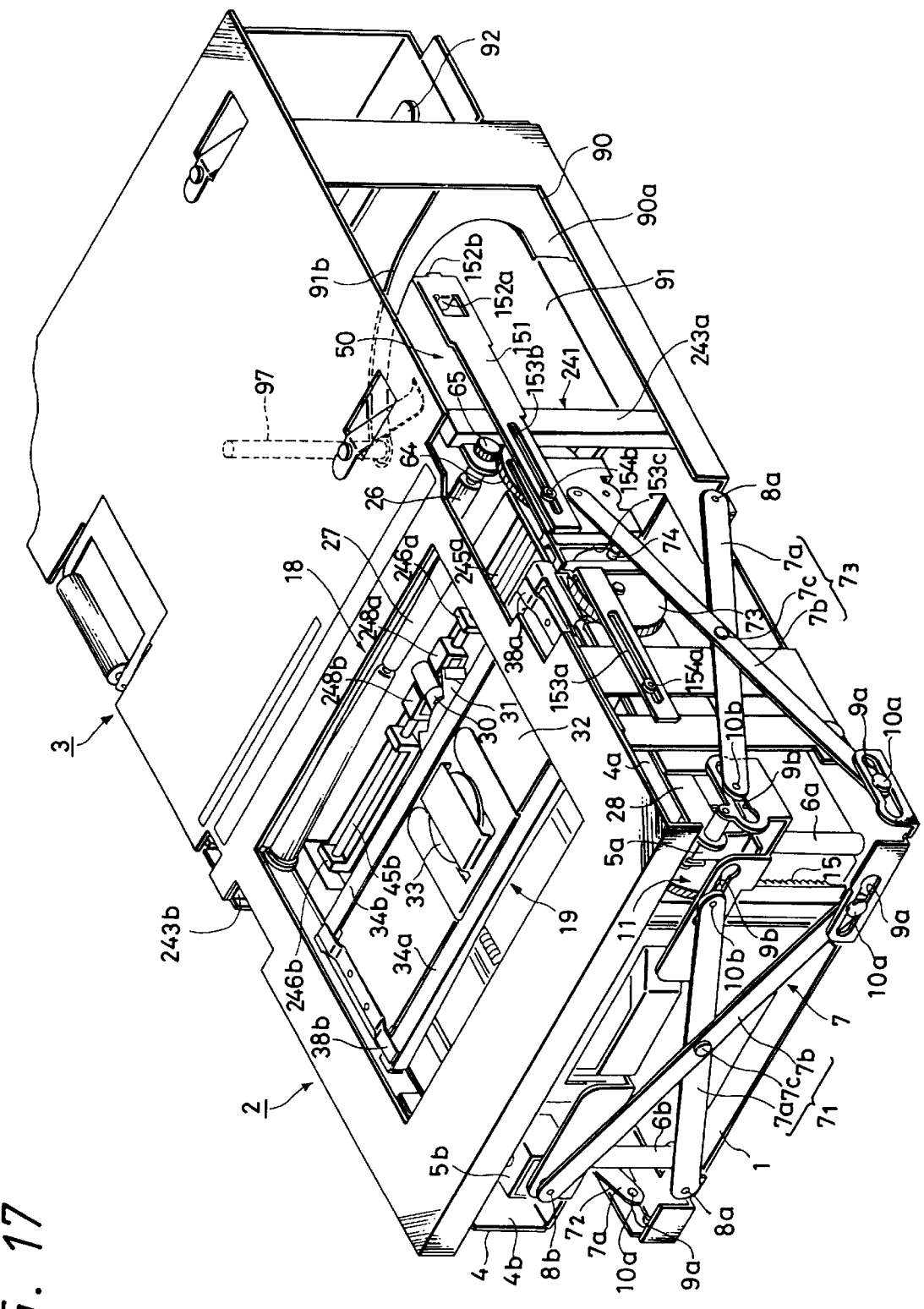
FIG. 17 is a perspective view illustrating an overall arrangement of a third embodiment of the disc player according to the present invention.
Figure 18:
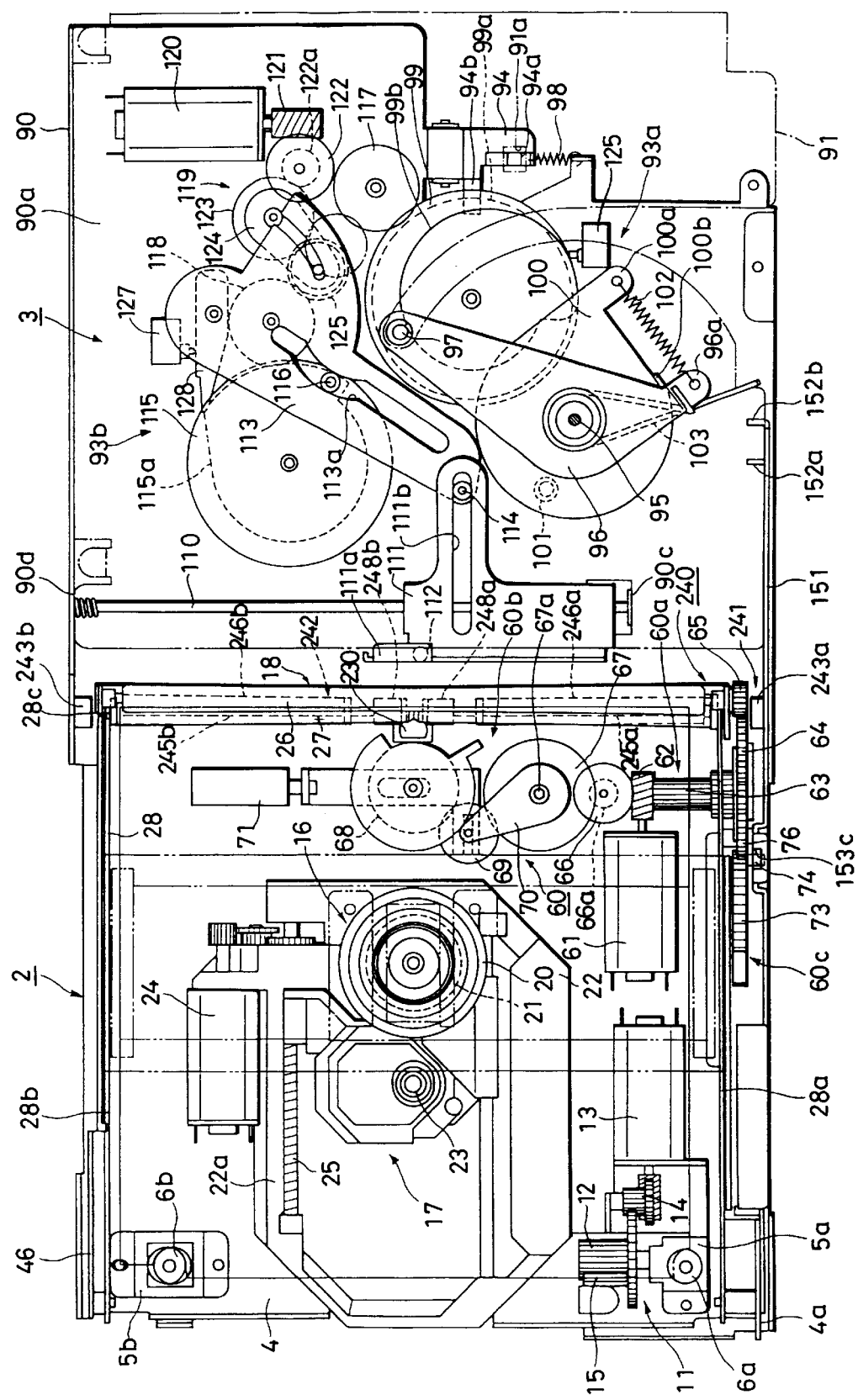
FIG. 18 is a fragmentary plan view of the disc player shown in FIG. 17.
Figure 19:
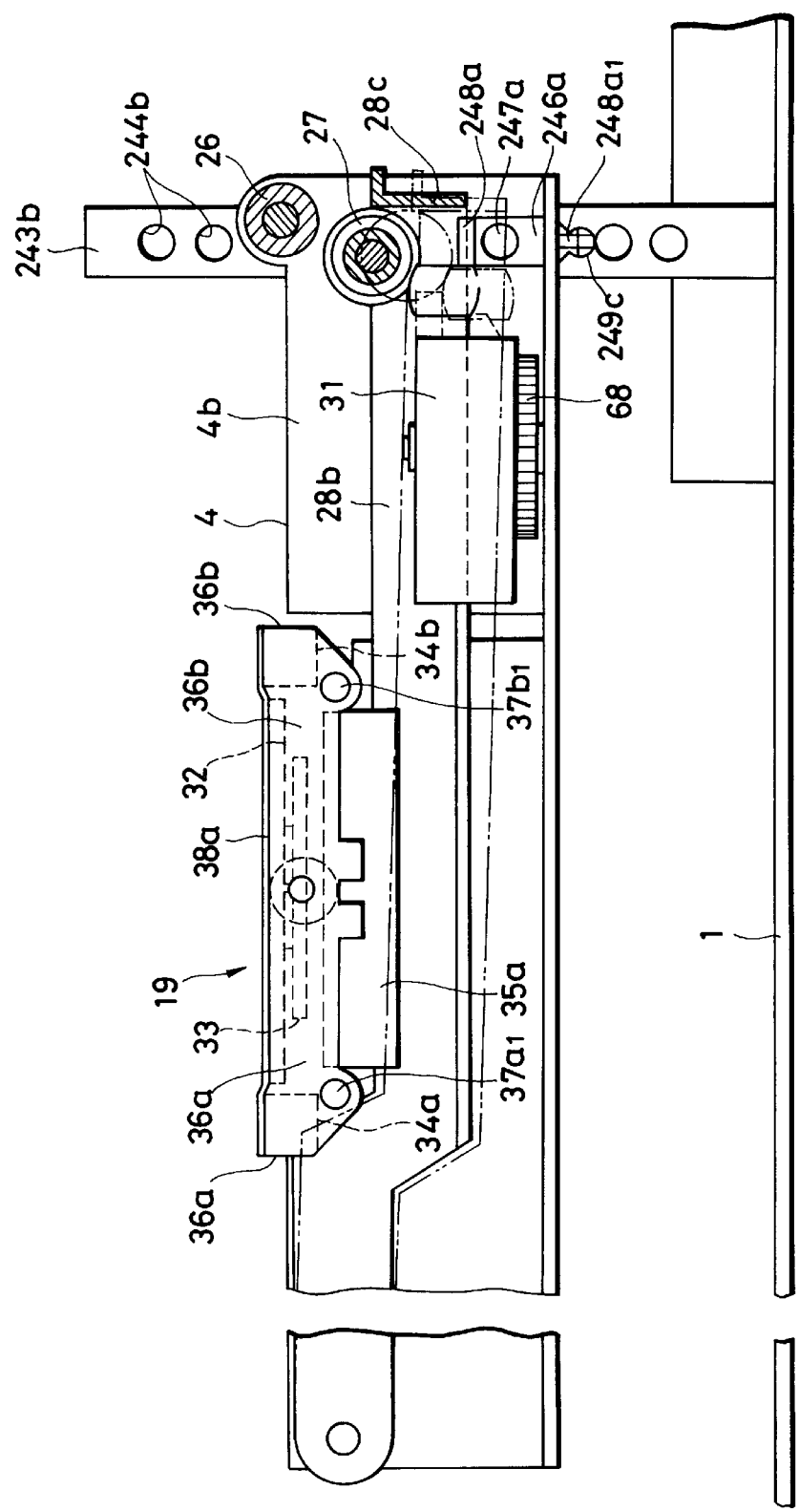
FIG. 19 is a fragmentary side view of another example of the main portion of the locking mechanism of the present invention.
Figure 20:
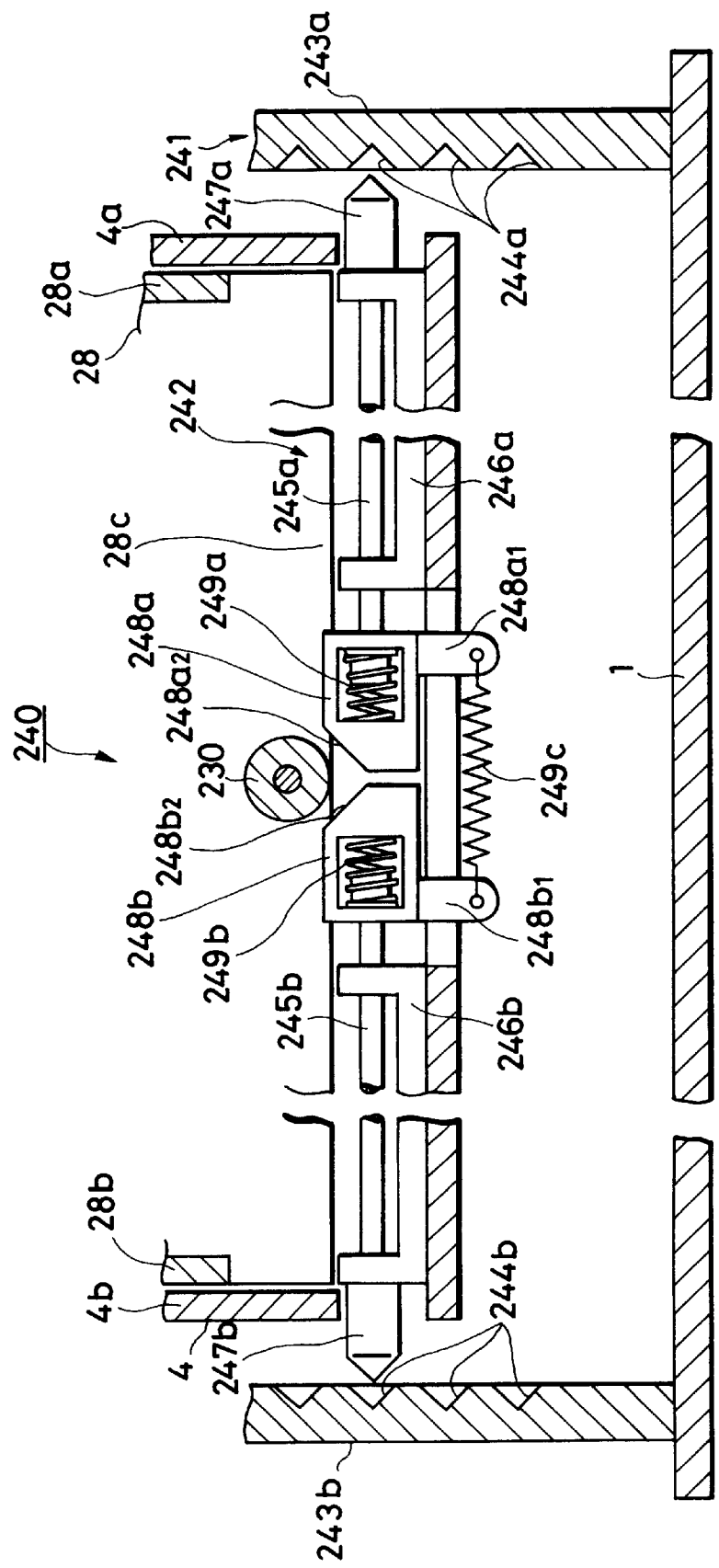
FIGS. 20 and 21 are respectively front views used to explain operation of the locking mechanism of the third embodiment of the present invention.
Figure 21:
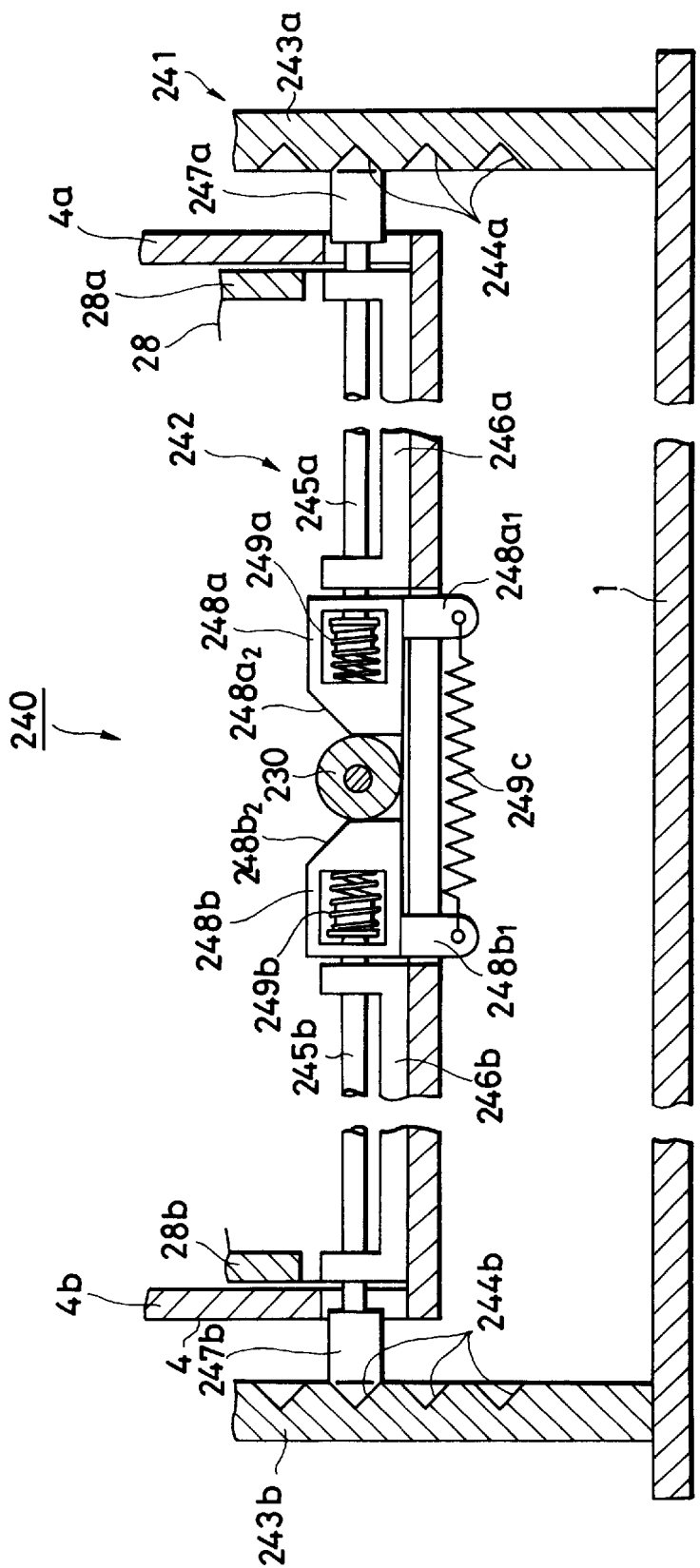

As shown in FIG. 10, a ganged operation plate 50 is provided on the rear portion of the other side wall of the elevator chassis 4 so as to slide in the front and rear direction and an engaging pin $46_3$ protrusively implanted on the operation plate 50 is engaged with the guide rectangular opening 41b bored through the rear locking lever $41_3$ of the other side wall of the elevator chassis 4 so that, when the operation plate 50 is slid in the front and rear direction, then the locking lever $41_3$ is rotated.

As shown in FIGS. 1 and 2, the operation lever 50 is coupled to the pull-out lever 44 by means of a ganged bar 51. More specifically, the ganged bar 51 is pivoted to the top of the supporting member $4b_1$ elongated inwardly from the rear upper edge of the other side wall plate 4b of the elevator chassis 4 in the horizontal direction, and one end of the ganged bar 51 is pivoted to an arm member 44a horizontally protruded from the upper edge portion of the pull-out lever 44. The other end of the ganged bar 51 is coupled to the front edge portion of the operation plate 50 by means of a tension coil spring 52 and the front edge of the other end portion is engaged with an engaging stepped portion 50a formed on the front upper edge portion of the operation plate 50, whereby the operation plate 50 is coupled to the pull-out lever 44. The locking operation member 42 is constructed as described above.

In the locking mechanism 40 thus constructed of the elevator chassis 4, when the pull-out lever 44 for pulling out the optical disc from the disc housing unit 3 is not operated, or when the pull-out lever 44 is not operated to pull out the optical disc from the disc housing unit 3, the pull-out lever 44 is located at the rear position so that the operation lever 45 is engaged with the engaging piece member 44a formed at the top of the pull-out lever 44 and is thereby slid toward the rearward. As a consequence, the locking levers $41_1$, $41_2$ formed on one side wall of the elevator chassis 4 are pushed and inclined rearward by the engaging pins $46_1$, $46_2$ of the operation lever 45 via the guide rectangular openings 41b, thereby the engaging grooves 41a being released from the engaging pins $43_1$, $43_2$ of the elevator chassis 4.

Also, since one end portion of the ganged bar 51 is rotated rearward about a pivot portion to the supporting piece member $4b_1$ when the pull-out lever 44 is located at the rear position, the other end portion of the ganged bar 51 slidably pushes forward the operation plate 50 of the other side wall side of the elevator chassis 4 via the engaging stepped portion 50a, whereby the rear locking lever $41_3$ on the other side wall of the elevator chassis 4 is pushed and inclined forward by the engaging pin $46_3$ of the operation plate 50 via the guide rectangular opening 41b. Thus, the rear locking lever $41_3$ is detached from the engaging pin $43_3$ of the elevator chassis 4.

As described above, under the condition that the pull-out lever 44 is disabled to pull out the optical disc from the disc housing unit 3, the elevator chassis 4 is released from being locked by the locking lever 41 ($41_1$, $41_2$, $41_3$).

When the disc pull-out lever 44 is made operable, or when the pull-out lever 44 is moved forward in this locking released state, then the operation lever 45 is released from being pushed by the engaging piece member 45a and slid forward by a contracting spring force of the tension coil spring 47. As a result, by the slidable movement of the operation lever 45, the locking levers $41_1$, $41_2$ formed on one side wall of the elevator chassis 4 are erected and rotated forward by means of the engaging pins $46_1$, $46_2$, whereby one of the engaging grooves $41a_1$, $41a_2$ through $41a_{10}$ is engaged with the engaging pins $43_1$, $43_2$ of the elevator chassis 4.

Since one end portion of the ganged lever 51 is rotated forward about a pivot point with respect to the supporting piece member $4b1$ by the forward movement of the pull-out lever 44 and the other end portion thereof is displaced in the rear direction, the ganged lever 51 is released from the engaging stepped portion 50a of the operation plate 50 and placed in the state such that the ganged lever 51 is released from pushing the operation plate 50. Also, the operation plate 50 is slid rearward by the contracting spring force of the tension coil spring 52, and the rear locking lever $41_3$ on the other side wall is erected and rotated rearward by the slidable movement of the operation plate 50 via the engaging pin $46_3$, thereby one of the engaging grooves $41a_1$, $41a_2$ through $41a_{10}$ being engaged with the engaging pin $43_3$ of the elevator chassis 4.

In this way, the elevator chassis 4 is locked to the chassis 1 at the front and rear portions of one side wall portion thereof and the rear portion of the other side wall portion thereof by the engagement among the locking levers $41_1$, $41_2$, $41_3$ and the engaging pins $43_1$, $43_2$, $43_3$ and secured to the chassis 1 substantially perfectly.

A drive mechanism 60 for the disc transport mechanism 18, the disc chucking mechanism 19 of the thus arranged disc reproducing mechanism 2 and the locking mechanism 40 of the elevator chassis 4 is driven by a single motor 61 installed on the elevator chassis 4.

In the drive mechanism 60, a drive portion 60a for driving the drive roller 26 of the disc transport mechanism 18 is comprised of a worm gear 62 pivotally coupled to the rotary shaft of the motor 61, a first worm wheel 63 of a shaft configuration meshed at one end thereof with the worm gear 62, a first large gear 64 pivotally supported to the one side wall plate 4a of the elevator chassis 4 and with which the other end of the worm wheel 63 is meshed, and a small gear 65 secured to the drive shaft of the drive roller 26 and which is meshed with the first large gear 64.

A drive unit for driving the disc chucking mechanism 19, i.e., a drive unit 60b of the cam 31 is constructed such that a second worm wheel 66 is meshed with the aforesaid worm gear 62, a small gear 66a coaxially formed on the worm wheel 66 as one body therewith is meshed with a second large gear 67, a mid gear 69 meshed both with the large gear 67 and a gear 68 coaxially formed on the cam 31 as one body therewith. The mid gear 69 is pivotally supported to an arm 70 which is pivotally supported by a shaft 67a of the large gear 67 and the mid gear 69 is brought in contact with or released from the gear 68 of the cam 31 via a universal member 72 by a plunger 71 driven by a predetermined drive signal.

In a drive unit of the locking mechanism 40, i.e., in a drive unit 60c which slides the disc pull-out lever 44, a partial geneva stop gear 73 whose teeth are not fully formed is pivoted to one side wall plate 4a of the elevator chassis 4, and this geneva stop gear 73 is attached to a roller 74, which is engaged into a guide rectangular opening 44b bored through the pull-out lever 44 in the vertical direction. On the other hand, an arm 75 is pivoted to the shaft 64a of the first large gear 64 pivotally supported to the one side wall plate 4a of the elevator chassis 4 and a small gear 76, which is meshed with the large gear 64, is pivotally supported to the arm 75, whereby the small gear 76 is meshed with the geneva stop gear 73 in a range of the teeth formed on the geneva stop gear 73.

Figure 3:
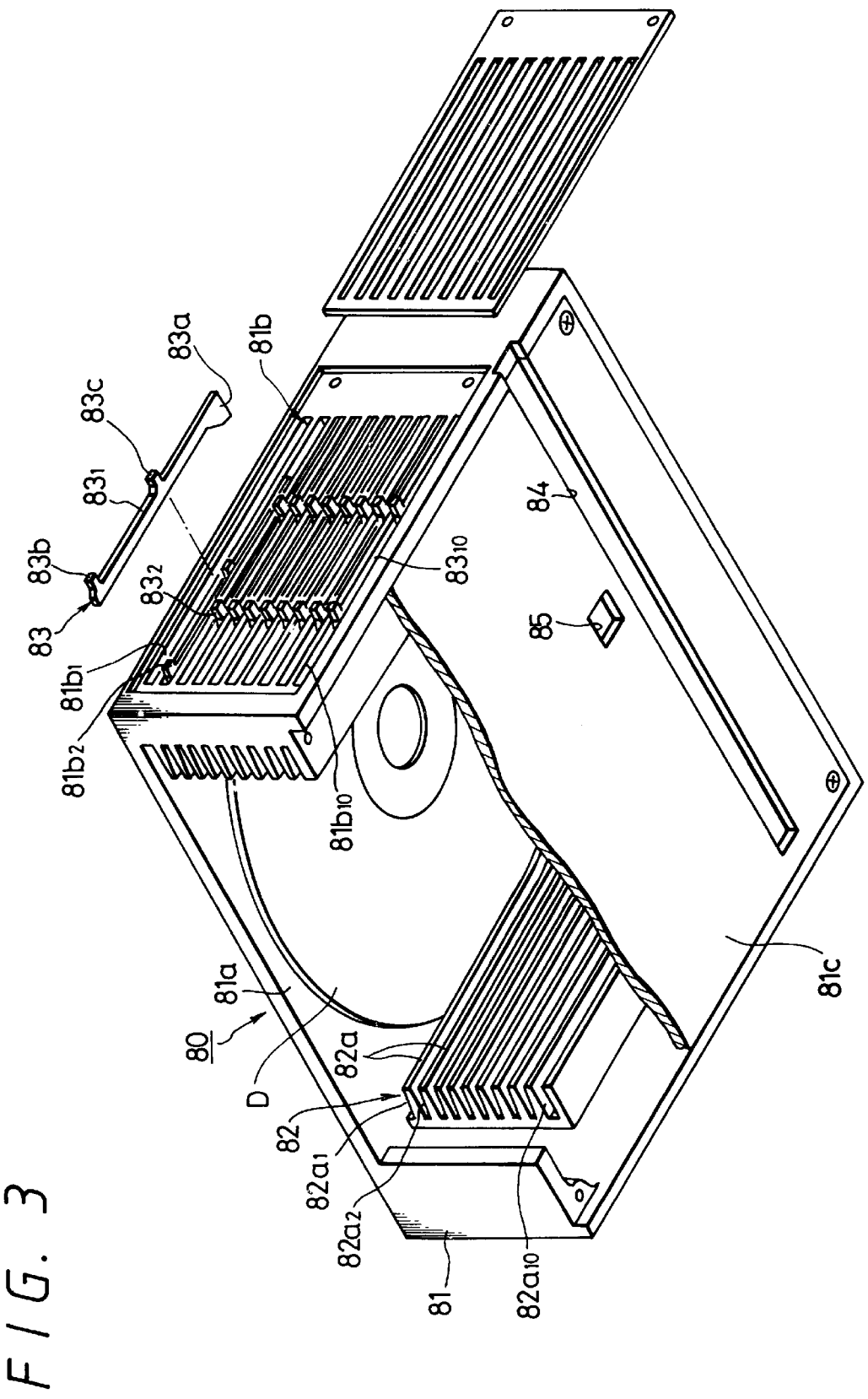
FIG. 3 is a perspective view of a disc pack used in the disc player of the present invention and illustrating the inside structure of the disc pack in a partly exploded fashion.
Figure 4:
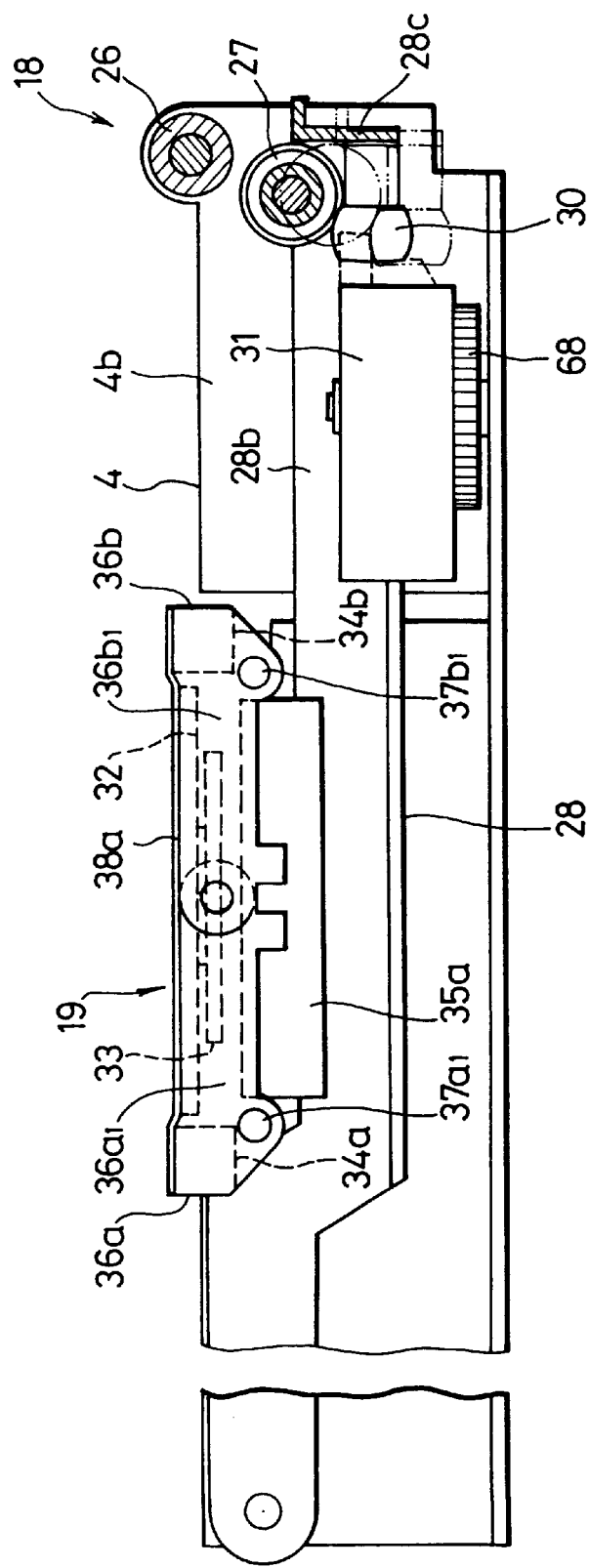
FIG. 4 is a fragmentary cross-sectional view of the disc pack used in the present invention.

An example of a disc pack set on the disc housing unit 3 provided on the latter half portion of the chassis 1 in response to the disc reproducing mechanism 2 thus arranged will be described below with reference to FIG. 3.

A disc pack 80 includes a housing 81 of rectangular solid configuration in which an opening portion 81a is formed on the front surface side thereof. Within the housing 81, a disc compartment portion 82 of staircase configuration is formed of a plurality of partition plates 82a in which a plurality of discs D are stacked. The disc compartment portions $82a_1$, $82a_2$ through $82a_{10}$ of respective stages have at one side portion sides thereof sliders 83 ($83_1$, $83_2$ through $83_{10}$) provided so as to become slidable in the front and rear direction, i.e., in the direction of the opening portion 81a. The slider 83 has at its inner edge side thereof a pushing member 83a which is brought in contact with the outer peripheral edge portion of the disc D. Also, the slider 83 has at front and rear portions of the outer edge side thereof formed engaging members 83b, 83c protruded to the outside from slits 81b ($81b_1$, $81b_2$ through $81b_{10}$) formed through one side wall of the housing 81 in the front and rear direction in accordance with the compartment portions $82a_1$, $82a_2$ through $82a_{10}$ of the respective stages. A groove 84 is formed through a bottom plate 81c of the housing 81, which extends to one end face portion of the bottom plate 81c, and a locking concave portion 85 is formed on the bottom plate 81c.

The optical disc D housed in each of the compartment portions $82a_1$, $82a_2$ through $82a_{10}$ within the housing 81 of the disc pack 80 is pushed by the pushing member 83a by slidably moving the slider 83 forward by rearwardly pushing from the outside the engaging members 83b, 83c of the slider 83 protruded from the slit 81b bored through one side wall portion of the housing 81 and is thereby transported from the front opening portion 81a. The discs D are transported one by one.

As shown in FIGS. 1 and 2, in the disc compartment mechanism 3 in which the disc pack 80 thus arranged is set, a pack loading table 91 is provided on the upper side of a bottom surface 90a of a loading frame portion 90 for loading therein the disc pack 80 so as to have a predetermined spacing. The pack loading table 91 has on its surface a guide rail 92 made of a lubricant material such as a synthetic resin or the like and which is engaged with the groove 84 in the insertion direction of the disc pack 80. This loading frame portion 90 has in its spacing portion between the bottom surface 90a and the pack loading table 91 a locking eject mechanism 93a for locking the disc pack 80 in the loaded state and ejecting the same and a disc reset stopper mechanism 93b for returning and pushing the disc D toward the disc pack 80.

With the above-mentioned arrangement, the locking eject mechanism 93a is composed of a locking member 94 whose top engaging portion 94a is pivotally elevated so as to appear from a window aperture 91a formed through the pack loading table 91a and an eject shaft 97 implanted on the top portion of a first rotation arm plate 96 pivotally supported to the rear surface side of the pack loading table 91 by a shaft pin 95 in the horizontal direction. This eject shaft 97 is protruded from the upper surface of the pack loading table 91 by the length substantially equal to the height of the disc pack 80 and which is moved substantially from the central portion to the outer side edge portion by the rotation of the rotation arm plate 96 along an arcuate guide aperture 91b bored through the pack loading table 91 about the shaft pin 95.

The locking member 94 has on its inside edge portion a pushing member 94b protruded in response to the bottom surface 90a of the loading frame portion 90. This locking member 94 has a tension spring 98 extended between it and a hook member 90b erected on the bottom surface 90a so that the top engaging portion 94a is constantly spring-biased upward so as to protrude from the window aperture 91a bored through the pack loading table 91.

The locking member 94 is brought in slidable contact with an end face cam 99a formed on the lower surface side of a large gear 99 pivotally supported on the bottom surface 90a of the loading frame portion 90 and is thereby rotated in the vertical direction by the rotation of the large gear 99.

A rotary plate 100 is pivotally supported to the shaft pin 95 which pivotally supports the rotary arm plate 96 on which the eject plate 97 is implanted in an overlapping state with the rotary arm plate 96. The rotary plate 100 has a protruded member 101 implanted thereon which is slidably contacted with an arcuate cam portion 99b formed on the upper surface side of the large gear 99. Further, the rotary plate 100 is provided with a protruded member 100a opposing the protruded member 96a protruded from the other end portion of the rotary arm plate 96 and an engaging member 100b which is engaged with protruded member 96a of the rotary arm plate 96 so as to cause the protruded member 100a and the members 96 to oppose to one another with a predetermined spacing.

A tension coil spring 102 is extended between the protruded members 96a and 100a of the rotary arm plate 96 and the rotary plate 100 to thereby couple the two plates 96 and 100 in a spring-bias fashion, and the rotary arm plate 96 is spring-biased by a torsion spring 103 in such a fashion that the eject shaft 97 is constantly displaced toward the inside, i.e., toward the eject direction.

The disc reset stopper mechanism 93b is provided on the front side portion of the loading frame portion 90, i.e., between the loading frame portion 90 and the disc reproducing mechanism 2. In this mechanism 93b, a movable frame 111 is slidably attached to a guide shaft 110, which is pivotally supported at its one end to a bearing member 90c protruded from the bottom surface 90a of the loading frame portion 90 and at the other end thereof to a side wall 90d and placed in parallel to the rollers 26, 27 of the disc transport mechanism 18 of the disc reproducing mechanism 2. A longitudinal frame portion 111a is erected on the movable frame 111 so as to pivotally support a rotary roller shaft 112 whose length is substantially equal to the height of the disc pack 80. A guide rectangular opening 111b is bored through the movable frame 111 in the direction perpendicular to the guide shaft 110, and this guide rectangular opening 111b is engaged with a roller pin 114 protruded from the top of a second rotary arm plate 113 pivotally supported to the bottom surface 90a. Then, a cam opening 113a is bored through the rotary arm plate 113 from its pivot portion to the roller pin 114 direction and the cam opening 113a is engaged with a roller pin 116 pivotally supported to the upper circumferential edge portion of a large gear 115 pivoted to the bottom surface 90a.

When this large gear 115 is rotated, then the rotary arm plate 113 is rotated by the engagement between the cam opening 113a and the roller pin 116 and the movable frame 111 is pushed by the engagement between the guide rectangular opening 111b and the roller pin 114, thereby being slid along the guide shaft 110.

Small gears 117 and 118 are respectively meshed with the large gears 99 and 115 of the thus arranged locking eject mechanism 93a and the disc reset stopper mechanism 93b and a rotation drive force is transmitted to the two small gears 117 and 118 by a switching gear drive mechanism 119. This switching gear drive mechanism 119 comprises a motor 120, a worm 121 pivotally supported to a motor shaft of the motor 120, a worm wheel 122 meshed with the worm 121 and which has a gear 122a coaxially formed as one body therewith, a mid gear 123 meshed with the integrated gear 122a of the worm wheel 122 and a switching gear 125 pivotally supported to an arm 124 pivotally supported to the shaft of the mid gear 123 so as to be meshed with the mid gear 123 and which is movably located between the small gears 117 and 118.

In the switching gear drive mechanism 119 thus arranged, by driving the motor 120, the worm wheel 122 is rotated via the worm 121 and the mid gear 123 is rotated by the gear 122a unitarily formed with the worm wheel 122, whereby the switching gear 125 is rotated by the rotation of the mid gear 123. This switching gear 125 is rotatably moved depending on the rotation direction of the mid gear 124 under the condition that it is supported to the arm 124. Therefore, the switching gear 125 is meshed with either the small gear 117 or 118 corresponding to the moving direction thereof and the rotation of the mid gear 123 is transmitted to the switching gear 125.

When the motor 120 is rotated in the reverse direction, the mid gear 123 also is rotated in the reverse direction, whereby the switching gear 125 is moved in the reverse direction and meshed with the other small gear 118 or 117, thereby the rotation of the mid gear 123 being transmitted thereto.

Micro switches 126 and 127 are provided in the proximity of the locking eject mechanism 93a and the disc reset stopper mechanism 93b. The micro switch 126 provided near the large gear 99 side of the locking eject mechanism 93a is directly operated by the arcuate cam 99b provided on the upper surface side of the large gear 99, while the micro switch 127 provided near the large gear 115 side of the disc reset stopper mechanism 93b is operated by pushing a rotary lever 128 disposed in an opposing fashion to an arcuate cam 115a of the lower surface of the large gear 115 by the arcuate cam 115a.

In the optical disc player thus arranged, a protruded portion 4d which protrudes toward the disc housing unit 3 side near one side portion is unitarily formed with the rear edge portion of the bottom surface portion 4c of the elevator chassis 4.

A locking arm 130 is rotatably supported at its substantially central portion on the bottom surface 90a of the loading frame portion 90 on the disc housing unit 3 side in an opposing relation to the protruded portion 4d of the elevator chassis 4. This locking member 130 is rotatably spring-biased to one direction by a torsion spring 131 and also is engaged with a limiter pin 132 protruded from the bottom surface 90a under the condition that a front end portion 130a of the locking arm 130 is overlapped on the aforementioned protruded portion 4d. Further, an engaging pin 133 is erected on a rear end portion 130b of this locking arm 130.

A pushing portion 100c with which the engaging pin 133 of the locking arm 130 is brought in rotatable contact is unitarily elongated from the protruded member 100a of the rotary plate 100, and an edge portion $100c_1$ in contact with the engaging pin 133 of the pushing portion 100c is curved. Thus, by the rotation of the rotary plate 100, the edge portion $100c_1$ of the pushing portion 100c is brought in slidable contact with the engaging pin 133.

This rotary plate 100 is pulled and rotated by means of the tension coil spring 102 extended between the protruded members 96a and 100a rotated when the rotary arm plate 96 on which the eject shaft 97 is erected as the disc eject member is rotated by pushing the disc eject shaft 97 upon loading of the disc pack 80.

When the rotary plate 100 is rotated as described above, the edge portion $100c_1$ of the pushing portion 100c comes in contact with the engaging pin 133 of the rear end portion 130b of the locking arm 130 to thereby rotate the rotary plate 100 further, whereby the locking arm 130 is pushed by means of the engaging pin 133 and rotated against the spring-biasing force of the torsion spring 131. As a consequence, the front edge portion 130a thereof is released from the corresponding position of the protruded portion 4d of the bottom surface portion 4c of the elevator chassis 4.

Operation of the optical disc player thus constructed will be described below.

Initially, when the disc pack 80 is loaded onto the disc housing unit 3, the disc pack 80 is pushed onto the pack loading table 91 installed on the loading frame portion 90 from the side walls against which the engaging members 83b, 83c of the slider 83 are protruded under the condition that the guide groove 80c of the bottom surface is inserted into the guide rail 92. Then, the disc pack 80 is abutted against the eject shaft 97 protruded substantially at the center of the disc loading table 91. When the disc pack 80 is further pushed against the eject shaft 97 strongly, the eject shaft 97 is pushed to rotate the rotary arm plate 96 against the spring-biasing force of the torsion spring 103, whereby the eject shaft 97 is slid forward along the side wall of the disc pack 80.

When the disc pack 80 is inserted into the disc housing unit 3, then the locking member 94 is pushed by the bottom surface of the disc pack 80 and entered completely into the window aperture 91a of the pack loading table 91 against the spring-biasing force of the tension coil spring 98, thereby the disc pack 80 being inserted into the disc compartment mechanism 3 without trouble.

When the disc pack 80 is completely inserted into the loading frame portion 90, then the locking concave portion 85 of the disc pack 80 is opposed to the window aperture 91a of the pack loading table 91. Under this condition, the locking member 94 is rotated by the spring-biasing force of the tension coil spring 98 and the top engaging portion 94a is projected from the window aperture 91a and is thereby engaged with the locking concave portion 85. Thus, the disc pack 80 is locked against the spring-biasing force of the torsion spring 95 applied thereto through the eject shaft 97 and then loaded on the disc housing unit 3.

In this state, the movable frame 111 of the disc reset stopper mechanism 93b is located at the front wall side of the disc pack 80, i.e., at substantially the central portion of the opening portion 80a side into and from which the disc D is loaded and unloaded. Then, the rotary roller shaft 112 pivotally supported to the longitudinal frame 111a is rotatably brought in contact with the central portion of the opening portion 80a, thereby preventing the disc D from being protruded from the opening portion 80a inadvertently. Further, in this state, the front engaging member 83b of one slider 83 of the disc pack 80 is inserted into a space between the tab members 44c and 44d protruded inwardly from the lever 44 at its rear portion.

When the disc D housed in the disc pack 80 loaded into the loading frame portion 90 of the disc housing unit 3 is reproduced, the disc reset stopper mechanism 93b is driven to move the movable frame 111 toward the side end portion of the loading frame portion 90, thereby the opening portion 81a of the disc pack 80 being opened.

In this state, the rotary plate 100 is rotated in accordance with the rotation of the rotary arm plate 96 to the outside to thereby rotate the locking arm 130, whereby the front end portion 130a of the locking arm 130 is released from the upper surface side of the protruded portion 4d formed on the bottom surface 4c of the elevator chassis 4 of the disc reproducing mechanism 2. Thus, the elevator chassis 4 is allowed to elevate. When the elevator chassis 4 is elevated by the elevating mechanism 11 or when the elevator chassis 4 is elevated by rotating the pinion 12 by driving the motor 13 through the reduction gear 14, the pull-out lever 44 is opposed to one of the sliders 83 ($83_1$, $83_2$ through $83_{10}$) of the disc compartment portion 82 ($82a_1$, $82a_2$ through $82a_{10}$) of the disc pack 80 in which the desired disc D is housed so as to hold the front engaging member 83b by the front and rear tab members 44c, 44d. In the state that the disc pack 80 is loaded onto the loading frame portion 90, the locking arm 130 is rotated and the elevator chassis 4 is released from being locked, thereby the elevator chassis 4 being allowed to elevate freely.

Accordingly, by driving the drive motor 61 of the drive mechanism 60, the drive roller 26 of the disc transport mechanism 18 is rotated by means of the drive unit 60a composed of the worm gear 62, the first worm wheel 63, the first large gear 64 and the small gear 65, and also the rotation of the first large gear 64 is transmitted to the geneva stop gear 73 of the drive unit 60c of the pull-out lever 44 through the small gear 76, whereby the geneva stop gear 73 is rotated to engage the roller 74 of the geneva stop gear 73 into the guide rectangular opening 44b, thereby the pull-out lever 44 being slid forward. By the slidable movement of the pull-out lever 44, the slider 83 of the disc pack 80 opposed by the pull-out lever 44 is pulled forward by the engagement between the engaging member 83d and the rear tab member 44d, whereby the disc D is pulled from the opening portion 81a and the front edge portion of the disc D is sandwiched between the rotating drive roller 26 and the follow-up roller 27 which are rotated as set forth. Thus, the disc D is transported forward by the rotation of the drive roller 26.

At timing point such that the disc D is pulled out by the forward sliding of the pull-out lever 44 and becomes sandwiched between the drive roller 26 and the follow-up roller 27, the toothless portion of the geneva stop gear 73 opposes the small gear 76 so that the pull-out lever 44 is slidably pulled forward and then stopped. In this state, the operation lever 45 of the locking mechanism 40 is slid forward by a spring-biasing force of the tension coil spring 47 and hence the locking levers $41_1$ and $41_2$ are erected and rotated, whereby one of the corresponding engaging grooves 41a is engaged with the engaging pins $43_1$ and $43_3$ protrusively formed on the elevator chassis 4. Also, on the other side wall side of the elevator chassis 4, the locking lever 41a is erected and rotated by the operation plate 50 via the ganged lever 51 in accordance with the slidable movement of the operation lever 45 to engage the corresponding engaging groove 41a with the engaging pin 43a, thereby the elevator chassis 4 being locked to the chassis 1 and then secured thereto.

Under the condition such that the elevator chassis 4 is locked to the chassis 1, the disc D is further transported and inserted into the under side of the pushing plate 32 of the chucking mechanism 19 and then held at its upper and lower respective peripheral edge portions by the upper holders 43a, 43b and lower holders 35a, 35b under the condition such that the central aperture of the disc D is opposed to the chucking plate 33. When the disc D is held in the predetermined condition as described above, this state is detected by a detecting mechanism (not shown). A detected signal from the detecting mechanism is supplied to drive the plunger 71 to allow the central gear 69 of the drive mechanism 60 to be meshed with the gear 68 of the cam 31. Thus, the rotation of the second large gear 67 is transmitted to the cam 31 and the cam 31 is thereby rotated. By the rotation of the cam 31, the movable support frame 28 is pushed downwardly through the roller 30 and is thereby rotated about the pivot portion of the front end portion. As a result, the disc D is moved downward together with the pushing plate 32 and during the period in which the disc D is moved downward, the upper holders 34a, 34b are engaged with the upper edges of the respective side wall plates 4a and 4b of the elevator chassis 4 via the engaging pins $37a_1$, $37a_2$ and $37b_1$, $37b_2$ and pushed upward from the pushing plate 32, thereby being released from the upper edge surface of the disc D. As a consequence, the disc D is chucked by the chucking plate 33 and is loaded on to the turntable 20 of the disc rotating mechanism 16.

In this fashion, under the condition that the disc D is held on the turntable 20, the playback is effected by the rotation of the turntable 20 by the spindle motor 21 and the transport of the optical pickup 23 of the signal read-out mechanism 17 by the motor 24 and the feed screw shaft 25.

The motor 61 of the drive mechanism 60 is stopped by the detected signal at timing point in which the disc D is loaded on to the turntable 20 and the cam 31 is stopped under the condition that it pushes the roller 30. Thus, the movable support frame 28 is lowered and held in this state.

The unloading operation in the end of the playback of the disc D will be described below.

Initially, the motor 61 of the drive mechanism 60 is rotated in the reverse direction by an unloading signal, whereby the cam 31 is rotated in the reverse direction through the aforementioned gear mechanism, thereby releasing the roller 30 from being pushed. Thus, the movable support frame 28 is rotated upwardly by the spring-biasing force of the compression coil spring. When the movable support frame 28 is moved upward, the disc D is lifted up from the turntable 20 by the lower holders 35a, 35b of the chucking mechanism 19 and also is pushed from the upper surface side by the upper holders 34a, 34b. Under this state, the rear edge portion side of the disc D is held by the drive roller 26 and the follow-up roller 27 and therefore the disc D is transported to the rearward by the drive roller 26 that is rotated in the reverse direction. If this operation is detected, then the plunger 71 is driven to allow the mid gear 69 to be detached from the gear 68 of the cam 31, thereby the cam 31 being stopped.

Under the condition that the disc D is transported to the rearward, the geneva stop gear 73 is rotated in the reverse direction to slide the pull-out lever 44 in the rearward, whereby the slider 83 of the disc pack 80 is moved backward, i.e., the slider 83 is inserted into the rear portion side of the housing 81 with a pressure. As a consequence, the disc D transported in the rearward is inserted into the compartment portion 82 thus pulled-out one more time. When the disc D is inserted into the compartment portion 82 as described above, the movable frame 111 of the disc reset stopper mechanism 93*b* is moved to the central portion of the opening portion 81*a* of the disc pack 80. In this case, the rotary roller shaft 112 is brought in rotatable contact with the front edge portion of the disc D to push the disc D, whereby the disc D is completely housed in the compartment portion 82. Therefore, in this state, the disc D is housed and kept within the disc pack 80 together with other discs D.

Since the pull-out lever 44 is located on the rear side in this state, the operation lever 45 of the locking mechanism 40 is slid rearward to tilt the locking levers $41_1$ and $41_2$ rearward and the locking lever $41_3$ also is tilted forward by the ganged lever 51, thereby the levers $41_1$, $41_2$ and $41_3$ being released from the engaging pins $43_1$, $43_2$ and $43_3$ of the elevator chassis 4 side, respectively. Thus, the elevator chassis 4 is released from being locked to the chassis 1 so that the elevator chassis 4 can be elevated so as to selectively oppose the compartment portion 82 of the disc pack 80.

Eject operation for ejecting the disc pack 80 from the loading frame portion 90 will be described below.

Initially, the motor 120 is driven to rotate the large gear 99 of the locking/eject mechanism 93*a* via the switching gear drive mechanism 119, whereby the pushing tab 94*b* of the locking member 94 is pushed by the end face cam portion 99*a*. As a consequence, the locking member 94 is rotated downwardly against the spring-biasing force of the tension spring 98 to allow the engaging member 94*a* to fully enter the window aperture 91*a* of the pack loading table 91, thereby the locking concave portion 85 of the disc pack 80 being disengaged from the engaging portion 94*a*, i.e., the disc pack 80 being released from the locked state. Owing to the locking released condition, the disc pack 80 is ejected from the loading frame portion 90 by the eject shaft 97 spring-biased by the torsion spring 103.

When the disc pack 80 is ejected from the loading frame portion 90 as described above, the rotary arm plate 96 is forced to inwardly rotate by the spring-biasing force of the torsion spring 103 and hence the rotary plate 100 is rotated and returned by engaging the protruded member 96*a* of the rotary arm plate 96 with the engaging member 100*b*.

By this returning rotation of the rotary plate 100, the engaging pin 133 of the locking arm 130 is released from being locked by means of the pushing portion 100*c*, and the locking arm 130 is rotated by the spring-biasing force of the torsion spring 131, whereby the front end portion 130*a* of the locking arm 130 is protruded toward the disc reproducing mechanism 2 side. That is, the locking arm 130 is rotated and the front end portion 130*a* thereof is located on the protruded portion 4d of the bottom surface portion 4*c* of the elevator chassis 4 moved downwardly to the lowest position relative to the chassis 1. Therefore, the elevator chassis 4 is locked to the elevating direction and fixed to the chassis 1.

As described above, according to this embodiment, the elevator chassis 4 having mounted thereon the disc reproducing mechanism 2 is locked to and released from being locked to the chassis 1 as a reference plane in the elevating direction in a ganged relation to the eject mechanism of the disc pack 80. Under the condition that the disc pack 80 is not loaded on to the loading frame portion 90 of the disc housing unit 3, the elevator chassis 4 is locked to the chassis 1, while when the disc pack 80 is loaded on to the loading frame portion 90, then the elevator chassis 4 is released from being locked to the chassis 1. Therefore, even if the optical disc player is dropped and shocked in some occasion such as transport, non-use or the like in which the disc pack 80 is not loaded onto the loading frame portion 90, the elevator chassis 4 is fixed to the chassis 1 and hence the pinion 12 and the rack 15 of the elevating drive mechanism 11 which elevates the elevator chassis 4 can be prevented from being disengaged from each other.

Another example of a locking mechanism 140 will be described with reference to FIGS. 13 through 16.

The locking mechanism 140 is comprised of a locking plate and a locking arm. The locking plate is composed of front and rear locking plates 141*a*, 141*b* provided at both rear side walls between the chassis 1 and the elevator chassis 4 and the locking arm is comprised of locking arms 142*a*, 142*b* attached to the elevator chassis 4. The locking plates 141*a*, 141*b* have on their rear edge sides a plurality of disc housing stages corresponding to predetermined elevating positions of the elevator chassis 4, that is, engaging slit groups 141*a* ($141a_1$, $141a_2$ through $141a_{10}$) and 141*b* ($141b_1$, $141b_2$ through $141b_{10}$) of substantially V-letter configuration corresponding to the first to tenth addresses communicated in the longitudinal direction in this embodiment.

The respective locking plates 141*a* and 141*b* are implanted on the chassis 1 at both rear sides. Then, by engaging one of the engaging grooves $141a_1$ through $141a_{10}$ and $141b_1$, through $141b_{10}$ with engaging pins 143*a*, 143*b* protruded from the locking arms 142*a*, 142*b* of the elevator chassis 4, the elevator chassis 4 is locked to the chassis 1 so that the elevator chassis 4 cannot be moved. When he locking arms 142*a*, 142*b* are rotated, then the engaging groove is released from the engaging pin, whereby the elevator chassis 4 is released from being locked to the chassis 1. Thus, the elevator chassis 4 can be elevated.

That is, the locking arms 142*a*, 142*b* of substantially L-letter configuration, which are engaged with the locking plates 141*a*, 141*b*, are formed of longitudinal side portions $142a_1$, $142b_1$, and lateral side portions $142a_2$, $142b_2$. Engaging pins 143*a*, 143*b* are protruded from the top inner surface sides of the longitudinal side portions $142a_1$. 142*b* in the lateral direction. Under the condition such that the locking arms 142*a*, 142*b* are protruded to the respective rear portions of the elevator chassis 4, the longitudinal side portions $142a_1$, $142b_1$ are protruded rearward and the upper edge sides of the lateral side portions $142a_2$, $142b_2$ are opposed to the rear end portions of the two side portions 28*a*, 28*b* of the movable support frame 28, the locking arms 142*a*, 142*b* are rotatably pivoted at their bent portions to the elevator chassis 4.

As described above, since the locking arms 142*a*, 142*b* pivoted to the elevator chassis 4 have the longitudinal side portions $142a_1$, $142b_1$ on which the engaging pins 143*a*, 143*b* are protruded, the longitudinal side portions $142a_1$, $142b_1$ are rotated rearwardly to allow the lateral side portions $142a_2$, $142b_2$ to be brought in contact with the under sides of the respective side portions 28*a*, 28*b* of the movable support frame 28. Under this state, the engaging pins 143*a*, 143*b* are disengaged from the engaging grooves of the locking plates 141*a*, 141*b* and are thereby released from the locked condition.

In order for the locking arms 142*a*, 142*b* to set in this state constantly, it is preferable that the locking arms 142*a*, 142*b* are spring-biased by some suitable means such as springs or the like.

Then, the movable support frame 28 is rotated downwardly, whereby the locking arms 142a, 142b are pushed at their lateral side portions $142a_2$, $142b_2$ downward to elevate the longitudinal side portions $142a_1$, $142b_1$, forward. As a result, the engaging pins 143a, 143b are engaged with the corresponding engaging grooves of the locking plates 141a, 141b, thereby the elevator chassis 4 being locked to the chassis 1.

The elevator chassis 4 has on its one side surface portion a pull-out lever 151 provided as the disc pull-out mechanism 150 for pulling out the disc D from the disc compartment portion 3. This pull-out lever 151 is extended toward the disc compartment portion 3 side and has at its rear end portion front and rear tab members 152a, 152b directed to the inside. Through the first half portion of the lever 151, guide rectangular apertures 153a, 153b are separately bored in the front and rear direction and are engaged with guide pins 154a, 154b protruded from the one side wall plate 4a of the elevator chassis 4. A vertical guide rectangular aperture 153c is formed between the guide rectangular apertures 153c and 153b.

When the disc D housed in the disc pack 80 loaded into the loading frame portion 90 of the disc housing unit 3 is reproduced, the disc reset stopper mechanism 93b is driven to move the movable frame 111 toward the side end portion of the loading frame portion 90, thereby the opening portion 81a of the disc pack 80 being opened.

In this state, when the elevator chassis 4 is elevated by the elevating mechanism 11 or when the elevator chassis 4 is elevated by rotating the pinion 12 by driving the motor 13 through the reduction gear 14, the pull-out lever 151 is opposed to one of the sliders 83 ($83_1$, $83_2$ through $83_{10}$) of the disc compartment portion 82 ($82a_1$, $82a_2$ through $82a_{10}$) of the disc pack 80 in which the desired disc D is housed so as to hold the front engaging member 83b by the front and rear tab members 152a, 152b.

Accordingly, by driving the drive motor 61 of the drive mechanism 60, the drive roller 26 of the disc transport mechanism 18 is rotated by means of the drive unit 60a composed of the worm gear 62, the first worm wheel 63, the first large gear 64 and the small gear 65, and also the rotation of the first large gear 64 is transmitted to the geneva stop gear 73 of the drive unit 60c of the pull-out lever 151 through the small gear 76, whereby the geneva stop gear 73 is rotated to engage the roller 74 of the geneva stop gear 73 into the guide rectangular opening 44b, thereby the pull-out lever 151 being slid forward. By the slidable movement of the pull-out lever 151, the slider 83 of the disc pack 80 opposed by the pull-out lever 44 is pulled forward by the engagement between the engaging member 83b and the rear tab member 44d, whereby the disc D is pulled from the opening portion 81a and the front edge portion of the disc D is sandwiched between the rotating drive roller 26 and the follow-up roller 27. Thus, the disc D is transported forward by the rotation of the drive roller 26.

At a point such that the disc D is pulled out by the forward sliding of the pull-out lever 151 and becomes sandwiched between the drive roller 26 and the follow-up roller 27, the toothless portion of the geneva stop gear 73 opposes the small gear 76 so that the pull-out lever 151 is slidably pulled forward and then stopped.

The disc D is further transported and inserted into the under side of the pushing plate 32 of the chucking mechanism 19 and then held at its upper and lower respective peripheral edge portions by the upper holders 43a, 43b and lower holders 35a, 35b under the condition such that the central aperture thereof is opposed to the chucking plate 33. When the disc D is held in the predetermined condition as described above, this state is detected by a detecting mechanism (not shown). A detected signal from the detecting mechanism is supplied to drive the plunger 71 to allow the central gear 69 of the drive mechanism 60 to be meshed with the gear 68 of the cam 31. Thus, the rotation of the second large gear 67 is transmitted to the cam 31 and the cam 31 is thereby rotated. By the rotation of the cam 31, the movable support frame 28 is pushed downwardly through the roller 30 and is thereby rotated about the pivot portion of the front end portion. As a result, the disc D is moved downward together with the pushing plate 32 and during the period in which the disc D is moved downward, the upper holders 34a, 34b are engaged with the upper edges of the respective side wall plates 4a and 4b of the elevator chassis 4 via the engaging pins $37a_1$, $37a_2$ and $37b_1$, $37b_2$ and pushed up from the pushing plate 32, thereby being released from the upper edge surface of the disc D. As a consequence, the disc D is chucked by the chucking plate 33 and is loaded on to the turntable 20 of the disc rotating mechanism 16.

On the other hand, the movable support frame 28 is rotated downwardly, whereby the locking arms 142a, 142b of the locking mechanism 140 are pushed downwardly at their lateral side portions $142a_2$, $142b_2$. As a consequence, the locking arms 142a, 142b are rotated forward to erect the longitudinal side portions $142a_1$, $142b_1$ so that the engaging pins 143a, 143b implanted thereon are engaged with the corresponding engaging grooves of the locking plates 141a, 141b, thereby the elevator chassis 4 being locked to and fixed to the chassis 1.

Other example of a locking mechanism 240 will be described below with reference to FIGS. 17 through 21.

As illustrated, this locking mechanism 240 is comprised of a locking member 241 provided on the chassis 1 side and a locked member 242 provided on the elevator chassis 4 employed as the movable chassis and which is selectively engaged with the locking member 241.

The locking member 241 is composed of a pair of locking plates 243a, 243b implanted on the chassis 1, i.e., a reference plane in an opposing relation to the respective rear portions of the elevator chassis 4. These locking plates 243a, 243b have on their inner surfaces provided a plurality of disc compartment stages which are brought to predetermined elevating positions of the elevator chassis 4, i.e., a plurality of engaging concave portions 244a, 244b of substantially conical configuration corresponding to the compartment portions of the respective stages of the disc pack set in the disc housing unit 3, which will be described later, in the upper and lower direction with a predetermined spacing.

The locked member 242 is comprised of a pair of locking bars 245a, 245b provided on the rear portion of the elevator chassis 4 so as to become slidable from the center of the respective directions in correspondence with the aforesaid locking plates 243a, 243b. The locking bar 245a, 245b are slidably supported to support frames 246a, 246b secured to the elevator chassis 4, locking pins 247a, 247b engaged with the engaging concave portions 244a, 244b of the locking plates 243a, 243b are secured to the outer ends of the locking bars 245a, 245b and slide bases 248a, 248b are slidably inserted into the inner ends of the locking bars 245a, 245b. Then, limiter springs 249a, 249b are interposed between the inner end portions of the locking bars 245a and 245b, thereby the locked member 242 being slid relative to the locking bars 245a, 245b in a predetermined range.

The slide bases 248a, 248b are opposed at their inner end faces to each other by a spring-biasing force of a tension coil spring 249c extended between protruded members 248$a_1$ and 248$b_1$ respectively protruded from the lower surfaces of the slide bases 248a and 248b. These slide bases 248a, 248b are opposed by through a roller 230 pivoted to the rear side portion 28c of the movable support frame 28. Under the condition that the movable support frame 28 is rotated upward, the inner end faces of the slide bases 248a, 248b are substantially opposed to each other below the roller 30. When the movable support frame 28 is rotated downwardly, the roller 30 is inserted between the inner ends of the slide bases 248a, 248b. In order to insert the roller 30 between the inner ends smoothly, inclined surfaces 248$a_2$, 248$b_2$ inwardly inclined are formed on the upper surfaces of the inside hemispheric portions of the slide bases 248a and 248b so that, under the condition that the two slide bases 248a and 248b are abutted against each other, a groove portion of substantially V-letter configuration is formed in response to the roller 30.

Under the ordinary condition such that the movable support frame 28 is rotated upward, the pair of locking bars 245a and 245b of the locked member 242 provided on the elevator chassis 4 are pulled inwardly, and hence the roller 30 is locate distant above the slide bases 248a and 248b, whereby the slide bases 248a and 248b are inwardly slid by the spring-biasing force of the tension coil spring 249c, thereby the locking pins 247a, 247b formed on the outer ends of the locking bars 245a and 245b being released from the locking plates 243a, 243b, i.e., the locked member 242 being released from the locked state.

Accordingly, when the movable support frame 28 is rotated downwardly, the roller 30 comes in contact with the inclined surfaces 248$a_2$ and 248$b_2$ of the slide bases 248a, 248b which are abutted against each other to thereby outwardly push the slide bases 248a, 248b along the inclined surfaces 248$a_2$, 248$b_2$. By this sliding of the slide bases 248a, 248b, the locking bars 245a, 245b are pushed and slid to the outside through the limiter springs 249a, 249b. When the movable support frame 28 is rotated to the lowermost position, then the roller 30 enters between the rear end faces of the slide bases 248a, 248b to urge the slide bases 248a, 248b to be pushed outwards and slid against the spring-biasing force of the tension coil spring 249c.

As described above, the slide bases 248a, 248b are slid by the pressure, whereby the locking bars 245a, 245b are further slid to the outside to cause the locking pins 247a, 247b formed on the outer ends thereof to abut against the locking plates 243a, 243b, thereby being engaged with the corresponding engaging concave portions 244a, 244b. Thus, the elevator chassis 4 is locked to the chassis 1.

In the sliding operation of the locking bars 245a, 245b, even if the locking plates 243a, 243b are further pushed by the slide bases 248a, 248b under the condition such that the locking pins 247a, 247b abut against the locking plates 243a, 243b, this pushing force is absorbed by the limiter springs 249a, 249b and no pushing force acts on the locking bars 245a, 245b. Accordingly, the locking pins 247a, 247b can be prevented from being abutted against the locking plates 243a, 243b by a pushing force stronger than necessity. Therefore, the locking plates 243a, 243b can be prevented from being troubled.

Further, the slide bases 248a, 248b become slidable relative to the locking bars 245a, 245b which are in the engaged state against the spring-biasing force of the limiter springs 249a, 249b, whereby the roller 30 can smoothly enter the space between the two slide bases 248a, 248b. As a result, the movable support frame 28 can be rotated downwardly without trouble in the disc chucking operation which will be described later.

The elevator chassis 4 has on its one side surface portion a pull-out lever 151 provided as the disc pull-out mechanism 150 for pulling out the disc D from the disc compartment portion 3. This pull-out lever 151 is extended toward the disc compartment portion 3 side and has at its rear end portion front and rear tab members 152a, 152b directed to the inside. Through the first half portion of the lever 151, guide rectangular apertures 153c, 153b are separately bored in the front and rear direction and are engaged with guide pins 154a, 154b protruded from the one side wall plate 4a of the elevator chassis 4. A vertical guide rectangular aperture 153c is formed between the guide rectangular apertures 153c and 153b.

When the disc D housed in the disc pack 80 loaded into the loading frame portion 90 of the disc compartment mechanism 3 is reproduced, the disc reset stopper mechanism 93b is driven to move the movable frame 111 toward the side end portion of the loading frame portion 90, thereby the opening portion 81a of the disc pack 80 being opened.

In this state, when the elevator chassis 4 is elevated by the elevating mechanism 11. or when the elevator chassis 4 is elevated by rotating the pinion 12 by driving the motor 13 through the reduction gear 14, the pull-out lever 151 is opposed to one of the sliders 83 (83$_1$, 83$_2$ through 83$_{10}$) of the disc compartment portion 82 (82$a_1$, 82$a_2$ through 82$a_{10}$) of the disc pack 80 in which the desired disc D is housed so as to hold the front engaging member 83b by the front and rear tab members 152a, 152b.

Accordingly, by driving the drive motor 61 of the drive mechanism 60, the drive roller 26 of the disc transport mechanism 18 is rotated by means of the drive unit 60a composed of the worm gear 62, the first worm wheel 63, the first large gear 64 and the small gear 65, and also the rotation of the first large gear 64 is transmitted to the geneva stop gear 73 of the drive unit 60c of the pull-out lever 151 through the small gear 76, whereby the geneva stop gear 73 is rotated to engage the roller 74 of the geneva stop gear 73 into the guide rectangular opening 44b, thereby the pull-out lever 151 being slid forward. By the slidable movement of the pull-out lever 151, the slider 83 of the disc pack 80 opposed by the pull-out lever 151 is pulled forward by the engagement between the engaging member 83b and the rear tab member 44d, whereby the disc D is pulled from the opening portion 81a and the front edge portion of the disc D is sandwiched between the rotating drive roller 26 and the follow-up roller 27. Thus, the disc D is transported forward by the rotation of the drive roller 26.

At a point such that the disc D is pulled out by the forward sliding of the pull-out lever 151 and becomes sandwiched between the drive roller 26 and the follow-up roller 27, the toothless portion of the geneva stop gear 73 opposes the small gear 76 so that the pull-out lever 151 is slidably pulled forward and then stopped.

The disc D is further transported and inserted into the under side of the pushing plate 32 of the chucking mechanism 19 and then held at its upper and lower respective peripheral edge portions by the upper holders 43a, 43b and lower holders 35a, 35b under the condition such that the central aperture thereof is opposed to the chucking plate 33. When the disc D is held in the predetermined condition as described above, this state is detected by a detecting mechanism (not shown). A detected signal from the detecting mechanism is supplied to drive the plunger 71 to allow the mid gear 69 of the drive mechanism 60 to be meshed with the gear 68 of the cam 31. Thus, the rotation of the second large gear 67 is transmitted to the gear 68 and the cam 31 is thereby rotated. By the rotation of the cam 31, the movable support frame 28 is pushed downwardly through the roller 230 and is thereby rotated about the pivot portion of the front end portion. As a result, the disc D is moved downward together with the pushing plate 32 and during the period in which the disc D is moved downward, the upper holders 234a, 234b are engaged with the upper edges of the respective side wall plates 4a and 4b of the elevator chassis 4 via the engaging pins 237a, 237b and pushed upward against the pushing plate 32, thereby being released from the upper edge surface of the disc D. As a consequence, the disc D is chucked by the chucking plate 33 and is loaded on to the turntable 20 of the disc rotating mechanism 16.

On the other hand, when the movable supporting frame 28 is rotated downwardly, the roller 30 enters the rear end faces of the slide bases 248a, 248b of the locking mechanism 240 in the engaged condition along the inclined surfaces $248a_2$ and $248b_2$ thereof, whereby the slide bases 248a, 248b are slid to the outside. By this slidable movement of the slide bases 248a, 248b, the locking bars 245a, 245b are pushed and slid outwardly through the limiter springs 249a, 249b to urge the locking pins 247a, 247b formed on the outer ends to be engaged with the corresponding engaging concave portions 244a, 244b of the locking plates 243a, 243b erected on the chassis 1. Thus, the elevator chassis 4 is locked to and fixed to the chassis 1.

In this fashion of fixing the elevator chassis 4, under the condition that the disc D is held on the turntable 20, the playback is effected by the rotation of the turntable 20 by the spindle motor 21 and the transport of the optical pickup 23 of the signal read-out mechanism 17 by the motor 24 and the feed screw shaft 25.

In this state, the motor 61 of the drive mechanism 60 is stopped by the detected signal at a point in which the disc D is loaded on to the turntable 20 and the cam 31 is stopped under the condition that it pushes the roller 230. Thus, the movable support frame 28 is lowered and held in this state. Since the movable support plate 28 is held in the lowered state, the elevator chassis 4 is fixed to the chassis 1 and the reproduction of the disc D is carried out stably.

The unloading operation in the end of the playback of the disc D will be described below.

Initially, the motor 61 of the drive mechanism 60 is rotated in the reverse direction by an unloading signal, whereby the cam 31 is rotated in the reverse direction through the aforementioned gear mechanism, thereby releasing the roller 30 from being pushed. Thus, the movable support frame 28 is rotated upwardly by the spring-biasing force of the compression coil spring. When the movable support frame 28 is moved upward, the disc D is lifted up from the turntable 20 by the lower holders 35a, 35b of the chucking mechanism 19 and also is pushed from the upper surface side by the upper holders 34a, 34b. Under this state, the rear edge portion side of the disc D is held by the drive roller 26 and the follow-up roller 27 and therefore the disc D is transported to the rearward by the drive roller 26 that is rotated in the reverse direction. If this operation is detected, then the plunger 71 is driven to allow the mid gear 69 to be detached from the gear 68 of the cam 31, thereby the cam 31 being stopped. In this state, although the elevator chassis 4 is released from being locked by the locking mechanism 240, the elevator chassis 4 can be prevented from being elevated relative to the chassis 1 unnecessarily because the pinion 12 and the rack 15 of the elevating mechanism 11 are meshed with each other.

Under the condition that the disc D is transported to the rearward, the geneva stop gear 73 is rotated in the reverse direction to slide the pull-out lever 151 in the rearward, whereby the slider 83 of the disc pack 80 is moved backward, i.e., the slider 83 is inserted into the rear portion side of the housing 81 with a pressure. As a consequence, the disc D transported in the rearward is inserted into the compartment portion 82 thus pulled-out one more time. When the disc D is inserted into the compartment portion 82 as described above, the movable frame 111 of the disc reset stopper mechanism 93b is moved to the central portion of the opening portion 81a of the disc pack 80. In this case, the rotary roller shaft 112 is brought in rotatable contact with the front edge portion of the disc D to push the disc D, whereby the disc D is completely housed in the compartment portion 82. Therefore, in this state, the disc D is housed and kept within the disc pack 80 together with other discs D.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A disc player having a disc compartment in which a plurality of discs are stacked, said disc player comprising:
   a main chassis;
   an elevator chassis connected to said main chassis and having opposing side walls;
   a disc pull-out mechanism connected to said elevator chassis for performing a disc pull-out operation and pulling out one disc from said disc compartment and for performing a disc insertion operation for inserting the one disc into said disc compartment after the one disc has been reproduced;
   an elevation drive mechanism connected between said elevator chassis and said main chassis for moving said elevator chassis in a vertical direction;
   a locking mechanism connected between said main chassis and said elevator chassis for locking said elevator chassis at an arbitrary elevated position relative to said main chassis in a ganged relation with the disc pull-out operation of said disc pull-out mechanism and preventing subsequent relative movement between said main chassis and said elevator chassis in a locked position, wherein said elevator chassis is locked to said main chassis by said locking mechanism while the one disc pulled-out from said one disc compartment is reproduced;
   a disc rotating mechanism mounted on said elevator chassis for rotating the one disc pulled-out from said disc compartment while said elevator chassis is locked to said main chassis by said locking mechanism;
   a disc chucking mechanism mounted on said elevator chassis which urges the one disc against said disc rotating mechanism; and
   a supporting member connected to said elevator chassis and to said main chassis which can be freely contracted and expanded in the vertical direction and which supports said elevator chassis at least on its opposing side walls so that said elevator chassis can be stably elevated relative to said main chassis, wherein said elevator chassis is elevated by said elevation drive mechanism and the one disc is pulled out from and inserted into said disc compartment by said disc pull-out mechanism.

2. A disc player according to claim 1 wherein said locking mechanism for locking said elevator chassis to said main chassis comprises a locking member implanted on said main chassis and having a plurality of engaging portions formed therein corresponding to a plurality of predetermined movable positions of said elevator chassis and a locked member provided on said elevator chassis for engagement with said engaging portions of said locking member in a ganged relation with a releasing operation of said disc pull-out mechanism upon chucking of said disc.

3. A disc player according to claim 1 wherein said plurality of discs are stacked in a disc pack movable into and out of said disc compartment and further comprising a disc pack eject means arranged in said disc compartment for releasing the disc pack housed in said disc compartment and electing the disc pack therefrom and a locking member for locking said elevator chassis to said main chassis in a ganged relation to an ejecting operation of said disc eject means, wherein said elevator chassis is released from being locked to said main chassis upon loading said disc pack into said disc compartment and said elevator chassis is locked to said main chassis releasing and electing the disc pack from said disc compartment.

4. A disc player according to claim 1 wherein said disc compartment is formed with a disc insertion opening, further comprising a disc reset stopper mechanism mounted between said disc compartment and said disc pull-out mechanism, said disc reset stopper mechanism being reciprocated from one side of said disc insertion opening to substantially a central portion in substantially parallel relation to said disc insertion opening and said disc reset stopper mechanism being mounted at one side of said disc insertion opening when a disc is transported by said disc pull-out mechanism, while said disc reset stopper mechanism is moved substantially to the central portion just before the unloading of the disc is finished.

5. A disc player according to claim 1 wherein said disc chucking mechanism for chucking a disc transported to the disc rotating mechanism includes upper and lower holders for holding said disc at upper and lower surface edge portions of said disc near a line passing a center of said disc and said upper and lower holders are isolated from said disc after said disc is chucked to said disc rotating mechanism.

* * * * *